United States Patent
Saito et al.

(10) Patent No.: US 9,937,689 B2
(45) Date of Patent: Apr. 10, 2018

(54) POLARIZING FILM, METHOD FOR MANUFACTURE THEREOF, OPTICAL FILM, AND IMAGE DISPLAY DEVICE

(71) Applicant: NITTO DENKO CORPORATION, Ibaraki-shi, Osaka (JP)

(72) Inventors: Takeshi Saito, Ibaraki (JP); Masashi Shinagawa, Ibaraki (JP); Tetsurou Ikeda, Ibaraki (JP); Tatsuya Yamasaki, Ibaraki (JP); Toshiki Oomine, Ibaraki (JP); Shunsuke Shuto, Ibaraki (JP); Kentarou Kunishima, Ibaraki (JP); Makoto Tsuchinaga, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 643 days.

(21) Appl. No.: 14/205,555

(22) Filed: Mar. 12, 2014

(65) Prior Publication Data
US 2014/0320960 A1    Oct. 30, 2014

(30) Foreign Application Priority Data

Apr. 26, 2013 (JP) ................. 2013-094725

(51) Int. Cl.
*B32B 27/30* (2006.01)
*B32B 7/12* (2006.01)
(Continued)

(52) U.S. Cl.
CPC ............... *B32B 27/30* (2013.01); *B32B 7/12* (2013.01); *B32B 27/06* (2013.01);
(Continued)

(58) Field of Classification Search
CPC ............ B32B 7/12; B32B 27/06; B32B 27/30
See application file for complete search history.

(56) References Cited

U.S. PATENT DOCUMENTS

| 5,779,855 A | * | 7/1998 | Amo | ................. B29C 35/08 156/275.7 |
| 5,900,098 A | * | 5/1999 | Mueller | ................. B29C 35/08 156/275.7 |

(Continued)

FOREIGN PATENT DOCUMENTS

| JP | 9-31416 A | 2/1997 |
| JP | 2001-296427 A | 10/2001 |

(Continued)

OTHER PUBLICATIONS

Office Action dated Sep. 13, 2016, issued in counterpart Japanese Patent Application No. 2013-094725, with English translation. (11 pages).

(Continued)

*Primary Examiner* — Daniel McNally
(74) *Attorney, Agent, or Firm* — Westerman, Hattori, Daniels & Adrian, LLP

(57) ABSTRACT

In a method for manufacturing a polarizing film comprising a polarizer, a first transparent protective film provided on one surface of the polarizer with an adhesive layer interposed therebetween, and a second transparent protective film provided on another surface of the polarizer with an adhesive layer interposed therebetween, the adhesive layers are obtained by first using active energy rays to carry out irradiation by way of the first transparent protective film and then using the active energy rays to carry out irradiation by way of the second transparent protective film to cure the active energy ray-curable adhesive composition.

24 Claims, 2 Drawing Sheets

(51) Int. Cl.
   *B32B 27/06* (2006.01)
   *G02B 5/30* (2006.01)
(52) U.S. Cl.
   CPC ..... *B32B 2307/412* (2013.01); *B32B 2307/42* (2013.01); *G02B 5/3033* (2013.01)

(56) References Cited

U.S. PATENT DOCUMENTS

| | | | |
|---|---|---|---|
| 6,017,603 | A | 1/2000 | Tokuda et al. |
| 6,284,185 | B1 | 9/2001 | Tokuda et al. |
| 6,294,239 | B1 | 9/2001 | Tokuda et al. |
| 2007/0238805 | A1 | 10/2007 | Maeda et al. |
| 2008/0252973 | A1 | 10/2008 | Akari et al. |
| 2009/0174844 | A1* | 7/2009 | Li .................... C08K 5/34926 349/75 |
| 2012/0057230 | A1* | 3/2012 | Murakami .......... G02B 5/3033 359/483.01 |
| 2013/0293949 | A1* | 11/2013 | Saito ........................ C09J 4/00 359/352 |
| 2014/0320960 | A1 | 10/2014 | Saito et al. |

FOREIGN PATENT DOCUMENTS

| | | | |
|---|---|---|---|
| JP | 2005-179467 A | 7/2005 | |
| JP | 2006-220732 A | 8/2006 | |
| JP | 2008-9329 A | 1/2008 | |
| JP | 2008-174667 A | 7/2008 | |
| JP | 2008-214368 A | 9/2008 | |
| JP | 2008-252098 A | 10/2008 | |
| JP | 2008-276136 A | 11/2008 | |
| JP | 2008-287207 A | 11/2008 | |
| JP | 2009-75192 A | 4/2009 | |
| JP | 2009-294649 A | 12/2009 | |
| JP | 2010-78700 A | 4/2010 | |
| JP | 2010-184962 A | 8/2010 | |
| JP | 2011-52161 A | 3/2011 | |
| JP | 2011-128654 A | 6/2011 | |
| JP | 2012-52000 A | 3/2012 | |
| JP | 2012-144690 A | 8/2012 | |
| JP | 5090695 B2 | 12/2012 | |
| JP | 6122337 B2 | 4/2017 | |
| WO | 2008/050603 A1 | 5/2008 | |
| WO | WO 2012086465 A1 * | 6/2012 | ................ C09J 4/00 |
| WO | WO 2013051598 A1 * | 4/2013 | ................ B32B 7/12 |

OTHER PUBLICATIONS

Office Action dated May 26, 2017, issued in counterpart Chinese Application No. 201410061292.X, with English translation. (17 pages).

Office Action dated Jun. 16, 2017, issued in counterpart Taiwanese Patent Application No. 103110308, with English translation. (12 pages).

Office Action dated Dec. 20, 2017, issued in counterpart Japanese Application No. 2017-070229, with English translation (14 pages).

* cited by examiner

POLARIZING FILM, METHOD FOR MANUFACTURE THEREOF, OPTICAL FILM, AND IMAGE DISPLAY DEVICE

BACKGROUND OF THE INVENTION

Field of the Invention

The present invention relates to a polarizing film and a method for manufacture thereof. The polarizing film may be used alone or as a part of a laminated optical film to form image display devices such as liquid crystal displays (LCDs), organic electroluminescent (EL) displays, cathode ray tubes (CRTs), and plasma display panels (PDPs).

Description of the Related Art

The liquid crystal display market has experienced rapid growth in many applications such as clocks, cellular phones, personal digital assistants (PDAs), notebook PCs, PC monitors, DVD players, and TVs. Liquid crystal display devices use liquid crystal switching to visualize the polarization state, and based on the display principle, they use polarizers. Particularly in TV applications and so on, higher brightness, higher contrast, and wider viewing angle are required, and polarizing films are also required to have higher transmittance, higher degree of polarization, and higher color reproducibility.

For example, iodine polarizers made of stretched polyvinyl alcohol (hereinafter, also simply referred to as "PVA") to which iodine is adsorbed have high transmittance and high degree of polarization. Therefore, they are most popular polarizers widely used. A polarizing film commonly used includes a polarizer and transparent protective films bonded to both sides of the polarizer with a solution of a polyvinyl alcohol-based material in water, what is called an aqueous adhesive (Patent Documents 1 and 2 listed below). Triacetylcellulose or the like has high water-vapor permeability and therefore is used for transparent protective films.

A polarizing film can be produced using an aqueous adhesive such as a polyvinyl alcohol-based adhesive. In this case (what is called wet lamination), a drying step is necessary after a polarizer and a transparent protective film are bonded together. To increase polarizing film productivity, it is preferable to shorten the time required for such a drying step or to use an alternative bonding method with no need for any drying step.

Also when an aqueous adhesive is used, a polarizer needs to have a relatively high moisture content so that the adhesive can have high tackiness to the polarizer (a common polarizer has a moisture content of about 30%). Otherwise, the adhesive cannot provide good tackiness in the resulting polarizing film. Unfortunately, the polarizing film obtained in this way also has a problem such as a significant dimensional change at high temperature or high temperature and high humidity or low optical properties. To reduce such a dimensional change, a low-moisture-content polarizer or a low-water-vapor-permeability transparent protective film may be used. However, if such a polarizer and such a transparent protective film are bonded with an aqueous adhesive, drying efficiency or polarizing properties can degrade, or an appearance defect can occur, which can make it impossible to obtain practically useful polarizing films.

In recent years, as the screen size of image display devices (particularly typified by TVs) has increased, an increase in the size of polarizing films has also become very important in terms of productivity and cost (an increase in the yield or the number of available pieces). Unfortunately, polarizing films produced with the aqueous adhesive have the following problem. They can be dimensionally changed by heat from a backlight. The dimensional change can cause unevenness, so that a phenomenon in which a white part is visible against black background displayed on the whole of a screen, what is called light leakage (unevenness), can be significant.

To solve the problem with wet lamination, active energy ray-curable adhesives are proposed which contain no water or organic solvent. For example, Patent Document 3 listed below discloses an active energy ray-curable adhesive containing (A) a polar group-containing, radically polymerizable compound with a molecular weight of 1,000 or less, (B) a polar group-free, radically polymerizable compound with a molecular weight of 1,000 or less, and (D) a photopolymerization initiator. Unfortunately, this adhesive tends to have low tackiness to polarizing films because the combination of radically polymerizable compounds (monomers) as components of this adhesive is designed to improve tackiness especially to norbornene resin films.

Patent Document 4 listed below discloses an active energy ray-curable adhesive including, as essential components, a photopolymerization initiator with a molar absorption coefficient of 400 or more at a wavelength of 360 to 450 nm and an ultraviolet-curable compound. Unfortunately, when used on polarizing films, this adhesive tends to have low tackiness to polarizing films because the combination of monomers as components of this adhesive is designed to prevent warpage or deformation mainly during bonding of optical discs or the like.

Patent Document 5 listed below discloses an active energy ray-curable adhesive containing (A) a (meth)acrylic compound having two or more (meth)acryloyl groups in the molecule, (B) a (meth)acrylic compound having a hydroxyl group and only one polymerizable double bond in the molecule, and (C) a phenol ethylene oxide-modified acrylate or a nonylphenol ethylene oxide-modified acrylate based on 100 parts by weight of the total amount of the (meth)acrylic compounds. Unfortunately, in the combination of monomers as components of this adhesive, the monomers have relatively low compatibility with one another, which can cause phase separation and a risk of a reduction in the transparency of the adhesive layer. This adhesive also has a risk of reducing durability such as crack resistance because it is designed to improve tackiness by softening (reducing the Tg of) a cured product (the adhesive layer). Crack resistance can be evaluated by thermal shock test (heat shock test).

The inventors have developed a radically polymerizable, active energy ray-curable adhesive by using an N-substituted amide monomer as a curable component (Patent Documents 6 and 7 listed below). This adhesive exhibits high durability in a severe environment at high humidity and high temperature. Now, however, the market is demanding adhesives capable of providing better tackiness and/or higher water resistance.

Patent Document 8 listed below describes a method of manufacturing a polarizing plate, which includes boding an ultraviolet non-transmitting protective film (A) to one side of a polarizer with an ultraviolet-curable adhesive interposed therebetween, bonding an ultraviolet transmitting protective film (B) to the other side of the polarizer with an ultraviolet-curable adhesive interposed therebetween, then using ultraviolet rays to carry out irradiation by way of the protective film (B) to simultaneously cure the ultraviolet-curable adhesives placed on the front and back sides of the polarizer. This manufacturing method is characterized by carrying out irradiation of ultraviolet rays by way of one side (one-stage UV irradiation) to simultaneously cure the ultraviolet-curable adhesives placed on the front and back sides of the polarizer so that high cost-effectiveness can be achieved.

PRIOR ART DOCUMENTS

Patent Documents

Patent Document 1: JP-A-2006-220732
Patent Document 2: JP-A-2001-296427
Patent Document 3: JP-A-2008-009329
Patent Document 4: JP-A-09-31416
Patent Document 5: JP-A-2008-174667
Patent Document 6: JP-A-2008-287207
Patent Document 7: JP-A-2010-78700
Patent Document 8: Japanese Patent No. 5090695

SUMMARY OF THE INVENTION

Unfortunately, the manufacturing method described in Patent Document 8 has the following problem. When irradiation of ultraviolet rays are carried out by way of only one side, the rate of reaction of the ultraviolet-curable adhesive between the ultraviolet non-transmitting protective film (A) and the polarizer can be insufficient, so that the protective film (A) and the polarizer can separate from each other in some cases. The intensity of the irradiation of ultraviolet can be increased to increase the rate of reaction of the ultraviolet-curable adhesive between the protective film (A) and the polarizer. In this case, however, a larger amount of ultraviolet rays can reach the polarizer to cause degradation of polarizing properties or to cause shrinkage of the polarizer, which can lead to a defect such as curling of the polarizing film. Also when the intensity of the ultraviolet irradiation is increased to increase the rate of reaction of the ultraviolet-curable adhesive between the protective film (A) and the polarizer, a larger amount of ultraviolet rays can reach the protective film (A), so that heat can be generated as the protective film (A) absorbs ultraviolet rays, which can cause a defect such as curling of the polarizing film.

As mentioned above, at present, conventional methods for manufacturing a polarizing film have difficulty in preventing curling of the polarizing film while increasing the rate of reaction of an adhesive composition interposed between a polarizer and a transparent protective film. In addition, conventional active energy ray-curable adhesive compositions can have insufficient tackiness to low-moisture-content polarizers, and a further improvement in tackiness is needed in the state of the art.

The present invention has been accomplished in view of the state of the art described above. It is an object of the present invention to provide a polarizing film manufacturing method that can prevent curling of a polarizing film while increasing the adhesion performance of an adhesive layer interposed between a polarizer and a transparent protective film. It is another object of the present invention to provide a polarizing film, an optical film, and an image display device, each including a polarizer, transparent protective films, and adhesive layers, in which the tackiness between the polarizer and each transparent protective film is improved, and the adhesive layers have improved durability and water resistance.

As a result of intensive studies to solve the problems, the present inventors have found that the problems can be solved by making creative modifications to methods for applying active energy rays in a process of manufacturing a polarizing film including a polarizer, adhesive layers each obtained by applying active energy rays to an active energy ray-curable adhesive composition, and transparent protective films provided on both sides of the polarizer with each adhesive layer interposed therebetween.

To solve the above problems, the present inventors also have focused attention on the SP (solubility parameter) values of curable components in an active energy ray-curable adhesive composition. In general, materials with SP values close to each other are considered to have high affinity for each other. For example, therefore, radically polymerizable compounds with SP values close to each other can have high compatibility with each other, and when a radically polymerizable compound in an active energy ray-curable adhesive composition has an SP value close to that of a polarizer, the adhesive layer can have high tackiness to the polarizer. Similarly, when a radically polymerizable compound in an active energy ray-curable adhesive composition has an SP value close to that of a protective film (such as a triacetylcellulose (TAC) film, an acrylic film, or a cycloolefin film), the adhesive layer can have high tackiness to the protective film. As a result of intensive studies based on these tendencies, the present inventors have found that the problems can be solved;

(I) when at least three types of radically polymerizable compounds in an active energy ray-curable adhesive composition are designed to have SP values each falling within a specific range and mixed in an optimal proportion and (II) when the active energy ray-curable adhesive composition contains an acrylic oligomer (D) formed by polymerization of a (meth)acrylic monomer.

The present invention has been accomplished as a result of the studies described above. The objects are achieved by the present invention with the features described below.

Specifically, the present invention is directed to a method for manufacturing a polarizing film including a polarizer, a first transparent protective film provided on one surface of the polarizer with an adhesive layer interposed therebetween, and a second transparent protective film provided on the other surface of the polarizer with an adhesive layer interposed therebetween, the method including: an applying step including applying an active energy ray-curable adhesive composition to at least one surface of the polarizer, the first transparent protective film, or the second transparent protective film; a laminating step including laminating the polarizer and the first transparent protective film and laminating the polarizer and the second transparent protective film; and a bonding step including bonding the polarizer and the first transparent protective film with an adhesive layer interposed therebetween and bonding the polarizer and the second transparent protective film with an adhesive layer interposed therebetween, wherein the adhesive layers are obtained by first using active energy rays to carry out irradiation by way of the first transparent protective film and then using the active energy rays to carry out irradiation by way of the second transparent protective film to cure the active energy ray-curable adhesive composition.

The method of the present invention for manufacturing a polarizing film includes first using active energy rays to carry out irradiation by way of the first transparent protective film and then using the active energy rays to carry out irradiation by way of the second transparent protective film (two-stage irradiation). In contrast to the conventional one-stage irradiation, this process not only can prevent curling of the transparent protective film, but also can increase the rate of reaction of the adhesive layer and increase the tackiness between the polarizer and the transparent protective film.

In the present invention, the first and second transparent protective films may be selected from various combinations of ultraviolet transmitting transparent protective films with a 365 nm wavelength light transmittance of 80% or more and/or ultraviolet non-transmitting transparent protective films with a 365 nm wavelength light transmittance of less than 5%.

Specifically, in the polarizing film manufacturing method, (1) the first transparent protective film preferably has a 365 nm wavelength light transmittance of 80% or more, and the second transparent protective film preferably has a 365 nm wavelength light transmittance of less than 5%, (2) the first transparent protective film preferably has a 365 nm wavelength light transmittance of less than 5%, and the second transparent protective film preferably has a 365 nm wavelength light transmittance of 80% or more, (3) the first and second transparent protective films preferably have a 365 nm wavelength light transmittance of less than 5%, or (4) the first and second transparent protective films preferably have a 365 nm wavelength light transmittance of 80% or more. The use of any of the combinations (1) to (4) makes it possible to prevent curling of the transparent protective film and to increase the rate of reaction of the adhesive layer and increase the tackiness between the polarizer and the transparent protective film in the manufacture of the polarizing film.

In the polarizing film manufacturing method, the active energy rays preferably include visible rays with a wavelength ranging from 380 nm to 450 nm.

In the polarizing film manufacturing method, the active energy rays are preferably such that the ratio of the total illuminance in the wavelength range of 380 nm to 440 nm to the total illuminance in the wavelength range of 250 nm to 370 nm is from 100:0 to 100:50.

In the polarizing film manufacturing method, the active energy rays are preferably produced using a gallium lamp as a light source and using a band pass filter to block ultraviolet rays with wavelengths of 380 nm or less.

The active energy ray-curable adhesive composition preferably contains, as a photopolymerization initiator, a compound represented by formula (1):

[Formula 1]

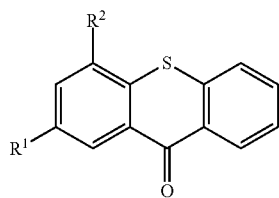
(1)

wherein $R^1$ and $R^2$ each represent —H, —$CH_2CH_3$, —IPr, or Cl, and $R^1$ and $R^2$ may be the same or different.

In the polarizing film manufacturing method, the composition preferably further contains, as a photopolymerization initiator, a compound represented by formula (2):

[Formula 2]

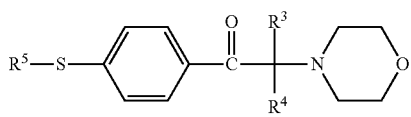
(2)

wherein $R^3$, $R^4$, and $R^5$ each represent —H, —$CH_3$, —$CH_2CH_3$, —IPr, or Cl, and $R^3$, $R^4$, and $R^5$ may be the same or different.

When ultraviolet rays whose dose is the highest at a wavelength of 360 to 370 nm, such as ultraviolet rays from a metal halide lamp or a high-pressure mercury lamp as a light source, are used and applied through an ultraviolet transmitting transparent protective film to cure an ultraviolet-curable adhesive composition, the transparent protective film can absorb the ultraviolet rays to generate heat, so that curling of the transparent protective film may occur.

In the polarizing film manufacturing method of the present invention, however, the absorption of active energy rays by the transparent protective film can be significantly reduced using visible rays with wavelengths in the range of 380 to 450 nm and using active energy rays being such that the ratio of the total illuminance in the wavelength range of 380 nm to 440 nm to the total illuminance in the wavelength range of 250 nm to 370 nm is from 100:0 to 100:50, in contrast to using normal ultraviolet rays. Therefore, curling of the polarizing film can be prevented, which would otherwise be caused by heat generated from the transparent protective film absorbing active energy rays.

The polymerization initiator of formula (1) can initiate polymerization with long-wavelength light capable of passing through a transparent protective film having the ability to absorb UV. Thus, the polymerization initiator of formula (1) makes it possible to cure the adhesive composition with light through an ultraviolet non-transmitting transparent protective film. In particular, the active energy ray-curable adhesive composition containing the photopolymerization initiator of formula (1) can be advantageously used to form an adhesive layer for bonding a polarizer and a transparent protective film with a 365 nm wavelength light transmittance of less than 5% (ultraviolet non-transmitting transparent protective film). When the active energy ray-curable adhesive composition contains the photopolymerization initiator of formula (1), a cured adhesive layer can be formed with active energy rays (visible rays) applied through the ultraviolet non-transmitting transparent protective film. Thus, the adhesive layer can be cured even in a polarizing film having ultraviolet non-transmitting protective films placed on both side of the polarizer. However, it will be understood that the adhesive layer can be cured also in a polarizing film having ultraviolet transmitting transparent protective films placed on the polarizer.

The use of a combination of the photopolymerization initiators of formulae (1) and (2) can particularly increase the tackiness of the adhesive layer because these materials can cause a photosensitizing reaction to increase the reaction efficiency.

In the polarizing film manufacturing method, the polarizer preferably has a thickness of 10 μm or less. In addition, the polarizing film preferably has a total thickness of 150 μm or less. After the adhesive layer is formed, the degree of occurrence of curling of the polarizing film is influenced by the thickness of the polarizer and the total thickness of the polarizing film. As each thickness decreases, the degree of occurrence of curling of the polarizing film increases. This means that a polarizing film having a thin polarizer or a thin polarizing film has its own problem due to its small thickness. However, the polarizing film manufacturing method of the present invention makes it possible to increase the adhesion performance of the adhesive layer between the polarizer and the transparent protective film and to prevent curling even when a polarizing film having a thin polarizer or a thin polarizing film is manufactured.

In a preferred mode of the polarizing film manufacturing method, the active energy ray-curable adhesive composition contains radically polymerizable compounds (A), (B), and (C) as curable components, and an acrylic oligomer (D) formed by polymerization of a (meth)acrylic monomer, the radically polymerizable compound (A) has an SP value of 29.0 $(MJ/m^3)^{1/2}$ to 32.0 $(MJ/m^3)^{1/2}$, the radically polymerizable compound (B) has an SP value of 18.0 $(MJ/m^3)^{1/2}$ to less than 21.0 $(MJ/m^3)^{1/2}$, the radically polymerizable compound (C) has an SP value of 21.0 $(MJ/m^3)^{1/2}$ to 23.0 $(MJ/m^3)^{1/2}$, and the composition contains 25 to 80% by weight of the radically polymerizable compound (B) when the total amount of the composition is normalized as 100% by weight.

The SP value of the radically polymerizable compound (B) is preferably from 18.0 $(MJ/m^3)^{1/2}$ to less than 21.0 $(MJ/m^3)^{1/2}$, and the content of the compound (B) is preferably from 25 to 80% by weight. The radically polymerizable compound (B) has a relatively low SP value significantly different from that of water (47.9 in SP value) and thus can significantly contribute to the improvement of the water resistance of the adhesive layer. The radically polymerizable compound (B) also has an SP value close to that of, for example, cyclic polyolefin resin (such as ZEONOR (trade name) manufactured by ZEON CORPORATION) (e.g., 18.6 in SP value) for the transparent protective film and thus can contribute to the improvement of the tackiness to the transparent protective film. To further increase the water resistance of the adhesive layer, the radically polymerizable compound (B) preferably has an SP value of less than 20.0 $(MJ/m^3)^{1/2}$. Particularly in view of the water resistance of the adhesive layer, the content of the radically polymerizable compound (B) is preferably 30% by weight or more, more preferably 40% by weight or more, when the total amount of the composition is normalized as 100% by weight. On the other hand, if the content of the radically polymerizable compound (B) is too high, the content of the radically polymerizable compounds (A) and (C) must be low, so that the tackiness to the adherend will tend to decrease. In addition, if the content of the radically polymerizable compound (B) is too high, the compatibility balance between the radically polymerizable compounds can degrade, so that the transparency of the adhesive layer may decrease as phase separation proceeds, because the radically polymerizable compound (B) has an SP value significantly different from that of the radically polymerizable compound (A). In view of the tackiness to the adherend and the transparency of the adhesive layer, therefore, the content of the radically polymerizable compound (B) is preferably 75% by weight or less, more preferably 70% by weight or less, when the total amount of the composition is normalized as 100% by weight.

In the active energy ray-curable adhesive composition used in the present invention, the radically polymerizable compound (A) preferably has an SP value of 29.0 $(MJ/m^3)^{1/2}$ to 32.0 $(MJ/m^3)^{1/2}$. The radically polymerizable compound (A) has a relatively high SP value and thus can contribute to the improvement of the tackiness between the adhesive layer and, for example, a PVA-based polarizer (e.g., 32.8 in SP value) or saponified triacetylcellulose (TAC, e.g., 32.7 in SP value) for the transparent protective film. Particularly in view of the tackiness between the adhesive layer and the polarizer and/or TAC, the content of the radically polymerizable compound (A) is preferably 3% by weight or more, more preferably 5% by weight or more, when the total amount of the composition is normalized as 100% by weight. On the other hand, the radically polymerizable compound (A) can have low compatibility with the acrylic oligomer (D) formed by polymerization of a (meth)acrylic monomer, and may form a nonuniform adhesive layer after cured if phase separation proceeds. Thus, to ensure the uniformity and transparency of the adhesive layer, the content of the radically polymerizable compound (A) is preferably 40% by weight or less, more preferably 30% by weight or less, when the total amount of the composition is normalized as 100% by weight.

The radically polymerizable compound (C) preferably has an SP value of 21.0 $(MJ/m^3)^{1/2}$ to less than 23.0 $(MJ/m^3)^{1/2}$. As mentioned above, the radically polymerizable compounds (A) and (B) have significantly different SP values and thus can have low compatibility with each other. However, the radically polymerizable compound (C) has an SP value between those of the radically polymerizable compounds (A) and (B), and thus the use of the radically polymerizable compounds (A) and (B) in combination with the radically polymerizable compound (C) can improve the compatibility between all components of the composition in a well-balanced manner. In addition, the radically polymerizable compound (C) has an SP value close to that of, for example, unsaponified triacetylcellulose (e.g., 23.3 in SP value) or an acrylic film (e.g., 22.2 in SP value) for the transparent protective film and thus can contribute to the improvement of the tackiness to the transparent protective films made of these materials. Thus, to improve water resistance and tackiness in a well-balanced manner, the content of the radically polymerizable compound (C) is preferably from 5 to 55% by weight. In view of the compatibility between all components of the composition and the tackiness to the transparent protective film, the content of the radically polymerizable compound (C) is more preferably 10% by weight or more. In view of water resistance, the content of the radically polymerizable compound (C) is more preferably 30% by weight or less.

The active energy ray-curable adhesive composition used in the present invention preferably contains an acrylic oligomer (D) formed by polymerization of a (meth)acrylic monomer in addition to the radically polymerizable compounds (A), (B), and (C) as curable components. The component (D) in the active energy ray-curable adhesive composition can reduce curing shrinkage when active energy rays are applied to the composition to be cured, and also can reduce interfacial stress between the adhesive and the adherend such as the polarizer or the transparent protective film. This makes it possible to suppress the reduction in the tackiness between the adhesive layer and the adherend. To suppress curing shrinkage of the cured layer (adhesive layer) sufficiently, the adhesive composition preferably contains 3% by weight or more, more preferably 5% by weight or more of the acrylic oligomer (D). On the other hand, if the content of the acrylic oligomer (D) in the adhesive composition is too high, the reaction rate may remarkably decrease upon irradiation of the composition with active energy rays, so that insufficient curing may occur. Thus, the content of the acrylic oligomer (D) in the adhesive composition is preferably 20% by weight or less, more preferably 15% by weight or less.

In the polarizing film manufacturing method, the composition preferably contains a radically polymerizable compound having an active methylene group and a radical polymerization initiator (E) having a hydrogen-withdrawing function. This feature can provide significantly improved tackiness for the adhesive layer of the polarizing film even immediately after the polarizing film is particularly taken out of a high-humidity environment or water (undried state).

Although the reason for this is not clear, the following factors can be considered. The radically polymerizable compound having an active methylene group can be polymerized with other radically polymerizable compounds used to form the adhesive layer. During the polymerization for forming the adhesive layer, the radically polymerizable compound having an active methylene group can be incorporated into the main chain and/or the side chain of the base polymer in the adhesive layer. When the radical polymerization initiator (E) having a hydrogen-withdrawing function is present in this polymerization process, hydrogen can be withdrawn from the radically polymerizable compound having an active methylene group so that a radical can be generated on the methylene group in the process of forming the base polymer for the adhesive layer. The radical-carrying methylene group can react with hydroxyl groups in the polarizer made of PVA or the like, so that covalent bonds can be formed between the adhesive layer and the polarizer. This may result in a significant improvement in the tackiness of the adhesive layer of the polarizing film particularly even in an undried state. For example, the radical polymerization initiator (E) having a hydrogen-withdrawing function may be the compound of formula (1) shown above.

In the polarizing film manufacturing method, the active methylene group is preferably an acetoacetyl group.

In the polarizing film manufacturing method, the radically polymerizable compound having an active methylene group is preferably acetoacetoxyalkyl(meth)acrylate.

In the polarizing film manufacturing method, the radical polymerization initiator (E) is preferably a thioxanthone radical polymerization initiator.

In the polarizing film manufacturing method, the composition preferably contains 1 to 50% by weight of the radically polymerizable compound having an active methylene group and 0.1 to 10% by weight of the radical polymerization initiator (E) when the total amount of the composition is normalized as 100% by weight.

In the polarizing film manufacturing method, the radically polymerizable compounds (A), (B), and (C) are each preferably capable of forming a homopolymer with a glass transition temperature (Tg) of 60° C. or higher, so that the adhesive layer can have particularly high durability and so that heat shock cracking can be prevented. As used herein, the term "heat shock cracking" means a phenomenon in which, for example, as the polarizer shrinks, it tears in the stretched direction. To prevent heat shock cracking, it is important to reduce expansion and shrinkage of the polarizer in the heat shock temperature range (−40° C. to 60° C.). When the radically polymerizable compounds (A), (B), and (C) are each capable of forming a homopolymer with a glass transition temperature (Tg) of 60° C. or higher as mentioned above, the resulting adhesive layer can also have a high Tg. This can suppress a sharp change in the elastic modulus of the adhesive layer in the heat shock temperature range, and can reduce the expansion or shrinkage force on the polarizer, so that heat shock cracking can be prevented.

Now, a method for calculating the SP value (solubility parameter) in the present invention will be described below.
(Method for Calculating Solubility Parameter (SP Value))

In the present invention, the solubility parameters (SP values) of the radically polymerizable compounds, the polarizer, and various transparent protective films can be calculated by Fedors's method (see Polymer Engineering and Science (Polymer Eng. & Sci.), Vol. 14, No. 2, pp. 148-154 (1974)) specifically using the expression:

$$\delta = \left[ \frac{\sum_i \Delta ei}{\sum_i \Delta vi} \right]^{1/2}$$

wherein $\Delta ei$ is evaporation energy at 25° C. attributable to atoms or groups, and $\Delta vi$ is molar volume at 25° C.

In the expression, $\Delta ei$ and $\Delta vi$ each represent a certain value given to I atoms or groups in the main molecule. Table 1 below shows typical examples of $\Delta e$ and $\Delta v$ values given to atoms or groups.

TABLE 1

| Atom or group | $\Delta e$ (J/mol) | $\Delta v$ (cm$^3$/mol) |
|---|---|---|
| CH$_3$ | 4086 | 33.5 |
| C | 1465 | −19.2 |
| Phenyl | 31940 | 71.4 |
| Phenylene | 31940 | 52.4 |
| COOH | 27628 | 28.5 |
| CONH$_2$ | 41861 | 17.5 |
| NH$_2$ | 12558 | 19.2 |
| —N= | 11721 | 5.0 |
| CN | 25535 | 24.0 |
| NO$_2$ (fatty acid) | 29302 | 24.0 |
| NO$_3$ (aromatic) | 15363 | 32.0 |
| O | 3349 | 3.8 |
| OH | 29805 | 10.0 |
| S | 14149 | 12.0 |
| F | 4186 | 18.0 |
| Cl | 11553 | 24.0 |
| Br | 15488 | 30.0 |

In the polarizing film manufacturing method, the total content of the radically polymerizable compounds (A), (B) and (C), and the acrylic oligomer (D) formed by polymerization of a (meth)acrylic monomer in the active energy ray-curable adhesive composition is preferably from 70 to 100 parts by weight based on 100 parts by weight of the total amount of the radically polymerizable compounds. According to this feature, the pressure-sensitive adhesive composition can have satisfactory contents of the radically polymerizable compounds (A), (B) and (C), and the acrylic oligomer (D), so that the adhesive layer can have a higher level of tackiness, durability, and water resistance. For the purpose of further improving tackiness, durability, and water resistance in a well-balanced manner, the total content of the radically polymerizable compounds (A), (B) and (C), and the acrylic oligomer (D) is preferably from 80 to 100 parts by weight, more preferably from 90 to 100 parts by weight.

In the polarizing film manufacturing method, the radically polymerizable compound (A) is preferably hydroxyethylacrylamide and/or N-methylolacrylamide. In the polarizing film manufacturing method, the radically polymerizable compound (B) is preferably tripropylene glycol diacrylate. In the polarizing film manufacturing method, the radically polymerizable compound (C) is preferably acryloylmorpholine and/or N-methoxymethylacrylamide. According to these features, the tackiness, durability, and water resistance of the adhesive layer can be improved in a better-balanced manner.

The present invention is also directed to a polarizing film manufactured by the polarizing film manufacturing method with any of the features described above, the polarizing film including a polarizer, adhesive layers, and transparent protective films provided on both sides of the polarizer with each adhesive layer interposed therebetween. The polarizing film is prevented from being curled, and the adhesive layer has high tackiness in the polarizing film.

In the polarizing film, the transparent protective films preferably have a water-vapor permeability of 150 g/m²/24 hours or less. According to this feature, moisture in the air hardly enters the polarizing film, and the polarizing film itself can be prevented from changing in moisture content. Therefore, storage environment-induced curling or dimensional change of the polarizing film can be prevented.

In the polarizing film manufacturing method, the polarizer preferably has a moisture content of less than 15% during the laminating step. This manufacturing method makes it possible to reduce the intensity of drying of the polarizing film obtained after the laminating step (lamination) and to produce a polarizing film in which the tackiness between the polarizer and the transparent protective film is high and the adhesive layer has a high level of durability and water resistance.

The present invention is also directed to an optical film including a laminate including at least one piece of the polarizing film set forth above.

The present invention is also directed to an image display device including the polarizing film set forth above and/or the optical film set forth above. In the optical film or the image display device, the polarizer and the transparent protective film in the polarizing film are strongly bonded with the adhesive layer interposed therebetween, and the adhesive layer has a high level of durability and water resistance.

DETAILED DESCRIPTION OF THE PREFERRED EMBODIMENTS

Figure 1:
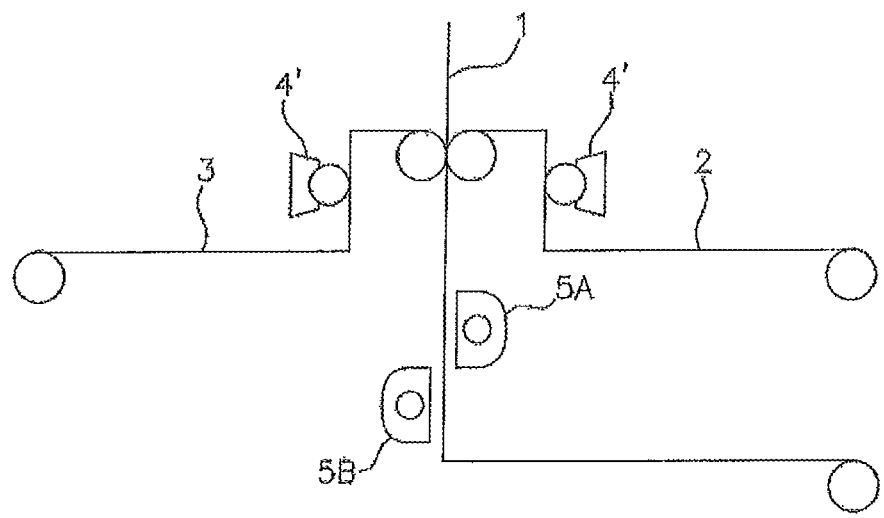
FIG. 1 is a schematic diagram showing an example of the method of the present invention for manufacturing a polarizing film.

FIG. 1 is a schematic diagram showing an example of the method of the present invention for manufacturing a polarizing film. It will be understood that the example shown in FIG. 1 is not intended to limit the method of the present invention for manufacturing a polarizing film. The method of this embodiment for manufacturing a polarizing film includes an applying step including applying an active energy ray-curable adhesive composition to at least one surface of a polarizer 1, a first transparent protective film 2, or a second transparent protective film 3; a laminating step including laminating the polarizer 1 and the first transparent protective film 2; a laminating step including laminating the polarizer 1 and the second transparent protective film 3; and a bonding step including bonding the polarizer 1 and the first transparent protective film 2 with an adhesive layer interposed therebetween and bonding the polarizer 1 and the second transparent protective film 3 with an adhesive layer interposed therebetween, wherein the adhesive layers are obtained by first using active energy rays to carry out irradiation by way of the first transparent protective film 2 and then using the active energy rays to carry out irradiation by way of the second transparent protective film 3 to cure the active energy ray-curable adhesive composition. In the laminating steps, the lamination of the polarizer 1 and the first transparent protective film 2 and the lamination of the polarizer 1 and the second transparent protective film 3 may be performed simultaneously, sequentially, continuously, or intermittently.

(Applying Step)

The applying step includes applying an active energy ray-curable adhesive composition to at least one surface of the polarizer 1, the first transparent protective film 2, or the second transparent protective film 3. Specifically, the active energy ray-curable adhesive composition may be applied to one or both surfaces of the polarizer 1, or the active energy ray-curable adhesive composition may be applied to the surface of the first transparent protective film 2 and/or the second transparent protective film 3, in which the surface is the side to be bonded to the polarizer 1. FIG. 1 shows an example in which the active energy ray-curable adhesive composition is applied to the surface of the first transparent protective film 2 and the surface of the second transparent protective film 3 using adhesive coaters 4', in which the surfaces are the sides to be bonded to the polarizer 1.

The polarizer 1 or the transparent protective film 2 or 3 may be subjected to a surface modification treatment before the active energy ray-curable adhesive composition is applied thereto. Examples of such a treatment include a corona treatment, a plasma treatment, a saponification treatment, etc.

The method for applying the active energy ray-curable adhesive composition is appropriately selected depending on the viscosity of the composition or the desired thickness. Examples of application means include a reverse coater, a gravure coater (direct, reverse, or offset), a bar reverse coater, a roll coater, a die coater, a bar coater, a rod coater, etc. Any other appropriate application method such as dipping may also be used.

(Laminating Step)

The polarizer 1 and the transparent protective films 2 and 3 are laminated with the adhesive interposed therebetween, which has been applied as described above. The lamination of the polarizer 1 and the transparent protective films 2 and 3 may be performed using a roll laminator or other laminators.

During the laminating step, the polarizer may have a moisture content of less than 15%. This moisture content is advantageous in that the intensity of drying of the polarizing film, which is obtained after the laminating step (lamination), can be reduced. The polarizer with such a low moisture content may be a thin polarizer whose moisture content can be easily reduced during drying by heating. Such a thin polarizer will be described below.

As described below, a thin polarizer (thin highly-functional polarizing film) can be advantageously manufactured by forming a thin highly-functional polarizing film on one side of a resin substrate. The manufacturing method of the present invention may be performed using such a thin polarizer. In this case, the applying step and the laminating step may be each performed twice. An example of the manufacturing method according to the present invention using a thin polarizer may include a first applying step including providing a laminated film including a resin substrate and a thin polarizer placed on one side of the resin substrate and applying an active energy ray-curable adhesive composition to the surface of the thin polarizer of the laminated film; a first laminating step including laminating a first transparent protective film to the adhesive composition-coated surface of the thin polarizer; a peeling step including peeling off the resin substrate from the thin polarizer; a second applying step including applying an active energy ray-curable adhesive composition to the surface of the thin polarizer, wherein the surface is on the side where the resin substrate has been peeled off; and a second laminating step including laminating a second transparent protective film to the adhesive composition-coated surface of the thin polarizer. In the first applying step, the active energy ray-curable adhesive composition may be applied to the surface of the first transparent protective film to be bonded to the thin polarizer, instead of to the thin polarizer. Also in the second applying step, the active energy ray-curable adhesive composition may be applied to the surface of the second transparent protective film to be bonded to the thin polarizer, instead of to the thin polarizer.

Figure 2:
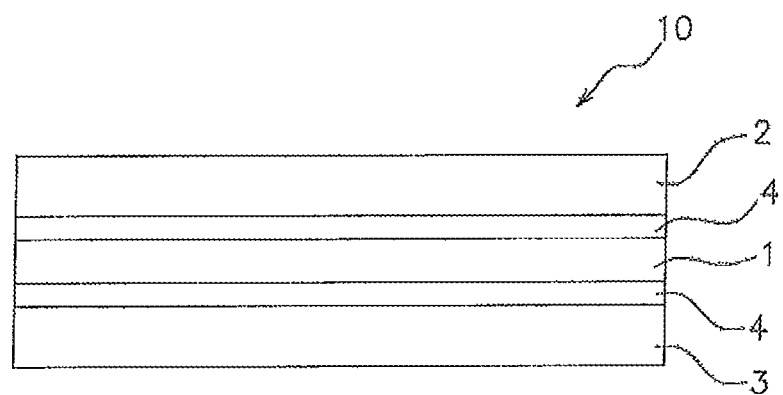
FIG. 2 is a schematic diagram showing an example of the polarizing film according to the present invention.

FIG. 2 is a schematic diagram showing an example of the polarizing film according to the present invention. As shown in FIG. 2, the polarizing film 10 according to this embodiment includes a polarizer 1, a first transparent protective film 2 provided on one side of the polarizer 1 with an adhesive layer 4 interposed therebetween, and a second transparent protective film 3 provided on the other side of the polarizer 1 with an adhesive layer 4 interposed therebetween. The laminating steps place the first transparent protective film 2 on one side of the polarizer 1 with a layer of an active energy ray-curable adhesive composition interposed therebetween and place the second transparent protective film 3 on the other side of the polarizer 1 with a layer of an active energy ray-curable adhesive composition interposed therebetween. These layers are cured into the adhesive layers 4.

(Bonding Step)

The bonding step will be described with reference to FIG. 2. First, the first transparent protective film 2 is irradiated with active energy rays, and then the second transparent protective film 3 is irradiated with active energy rays, so that the active energy ray-curable adhesive composition is cured to form an adhesive layer. The polarizer 1 and the first transparent protective film 2 are bonded with the resulting adhesive layer interposed therebetween, and the polarizer 1 and the second transparent protective film 3 are also bonded with the resulting adhesive layer interposed therebetween. FIG. 1 shows an example in which the first transparent protective film 2 is irradiated with active energy rays by means of an active energy ray irradiator 5A as a light source, and then the second transparent protective film 3 is irradiated with active energy rays by means of an active energy ray irradiator 5B as a light source, so that the active energy ray-curable adhesive composition is cured.

In the present invention, the first and second transparent protective films may be each selected from different modes including ultraviolet transmitting transparent protective films with a 365 nm wavelength light transmittance of 80% or more and/or ultraviolet non-transmitting transparent protective films with a 365 nm wavelength light transmittance of less than 5%.

(Mode 1: Transmitting to Non-Transmitting Mode)

First, a first transparent protective film having a 365 nm wavelength light transmittance of 80% or more (ultraviolet transmitting transparent protective film) is irradiated with active energy rays (first irradiation). A second transparent protective film having a 365 nm wavelength light transmittance of less than 5% (ultraviolet non-transmitting transparent protective film) is then irradiated with active energy rays (second irradiation), so that the polarizer and the transparent protective films are bonded together. In the present invention, the first irradiation allows a curing reaction to proceed in the active energy ray-curable adhesive composition interposed between the second transparent protective film and the polarizer, but its rate of reaction is not high enough. In other words, if only the first irradiation is performed, the adhesion between the second transparent protective film and the polarizer can be insufficient, and peeling can occur between them. When the second irradiation is further performed, however, the curing reaction can sufficiently proceed also in the active energy ray-curable adhesive composition interposed between the second transparent protective film and the polarizer, which can increase the adhesion of the adhesive layer and prevent curling of the polarizing film.

In the present invention, the modes described below may also be used in the bonding step. In any of the modes, the curing reaction can sufficiently proceed in the active energy ray-curable adhesive composition interposed between the second transparent protective film and the polarizer, which can increase the tackiness of the adhesive layer and prevent curling of the polarizing film.

(Mode 2: Non-Transmitting to Transmitting Mode)

First, a first transparent protective film having a 365 nm wavelength light transmittance of less than 5% (ultraviolet non-transmitting transparent protective film) is irradiated with active energy rays (first irradiation). A second transparent protective film having a 365 nm wavelength light transmittance of 80% or more (ultraviolet transmitting transparent protective film) is then irradiated with active energy rays (second irradiation), so that the polarizer and the transparent protective films are bonded together.

(Mode 3: Non-Transmitting to Non-Transmitting Mode)

First, a first transparent protective film having a 365 nm wavelength light transmittance of less than 5% (ultraviolet non-transmitting transparent protective film) is irradiated with active energy rays (first irradiation). A second transparent protective film having a 365 nm wavelength light transmittance of less than 5% (ultraviolet non-transmitting transparent protective film) is then irradiated with active energy rays (second irradiation), so that the polarizer and the transparent protective films are bonded together.

(Mode 4: Transmitting to Transmitting Mode)

First, a first transparent protective film having a 365 nm wavelength light transmittance of 80% or more (ultraviolet transmitting transparent protective film) is irradiated with active energy rays (first irradiation). A second transparent protective film having a 365 nm wavelength light transmittance of 80% or more (ultraviolet transmitting transparent protective film) is then irradiated with active energy rays (second irradiation), so that the polarizer and the transparent protective films are bonded together.

The active energy rays used may include electron beams or visible rays with wavelengths ranging from 380 nm to 450 nm. Although the long wavelength limit of the visible rays is around 780 nm, visible rays with wavelengths of more than 450 nm would not be involved in the absorption by polymerization initiators and may cause the transparent protective film and the polarizer to generate heat. In the present invention, therefore, a band pass filter is preferably used to block visible rays with wavelengths longer than 450 nm.

Electron beams may be applied under any appropriate conditions where the active energy ray-curable adhesive composition can be cured. For example, electron beams are preferably applied at an acceleration voltage of 5 kV to 300 kV, more preferably 10 kV to 250 kV. If the acceleration voltage is lower than 5 kV, electron beams may fail to reach the adhesive, so that insufficient curing may occur. If the acceleration voltage is higher than 300 kV, electron beams can have too high intensity penetrating through the material and thus may damage the transparent protective film or the polarizer. The exposure dose is preferably from 5 to 100 kGy, more preferably from 10 to 75 kGy. At an exposure dose of less than 5 kGy, the adhesive may be insufficiently cured. An exposure dose of more than 100 kGy may damage the transparent protective film or the polarizer and cause yellow discoloration or a reduction in mechanical strength, which may make it impossible to obtain the desired optical properties.

Electron beam irradiation is generally performed in an inert gas. If necessary, however, electron beam irradiation may be performed in the air or under conditions where a small amount of oxygen is introduced. When oxygen is appropriately introduced, oxygen-induced inhibition can be intentionally produced on the surface of the transparent protective film, to which electron beams are first applied, so that the transparent protective film can be prevented from being damaged and electron beams can be efficiently applied only to the adhesive, although it depends on the material of the transparent protective film.

The method of the present invention for manufacturing a polarizing film can prevent curling of the polarizing film while increasing the adhesion performance of the adhesive layer between the polarizer and the transparent protective film. For this effect, the active energy rays used preferably include visible rays with wavelengths ranging from 380 nm to 450 nm, specifically, visible rays whose dose is the highest at wavelengths ranging from 380 nm to 450 nm. When the transparent protective film used has the ability to absorb ultraviolet rays (the ultraviolet non-transmitting transparent protective film), it can absorb light with wavelengths shorter than about 380 nm. This means that light with wavelengths shorter than 380 nm cannot reach the active energy ray-curable adhesive composition and thus cannot contribute to the polymerization reaction of the composition. When absorbed by the transparent protective film, the light with wavelengths shorter than 380 nm is also converted into heat, so that the transparent protective film itself can generate heat, which can cause a defect such as curling or wrinkling of the polarizing film. In the present invention, therefore, the active energy ray generator used preferably does not emit light with wavelengths shorter than 380 nm. More specifically, the ratio of the total illuminance in the wavelength range of 380 to 440 nm to the total illuminance in the wavelength range of 250 to 370 nm is preferably from 100:0 to 100:50, more preferably from 100:0 to 100:40. The source of energy rays satisfying such a relation for the total illuminance is preferably a gallium-containing metal halide lamp or an LED light source emitting light with wavelengths ranging from 380 to 440 nm. Alternatively, a low-pressure mercury lamp, a middle-pressure mercury lamp, a high-pressure mercury lamp, an ultra-high-pressure mercury lamp, an incandescent lamp, a xenon lamp, a halogen lamp, a carbon arc lamp, a metal halide lamp, a fluorescent lamp, a tungsten lamp, a gallium lamp, an excimer laser, or sunlight may be used as the light source in combination with a band pass filter to block light with wavelengths shorter than 380 nm. For the purpose of preventing the polarizing film from curling while increasing the adhesion performance of the adhesive layer between the polarizer and the transparent protective film, it is preferable to use active energy rays obtained through a band pass filter capable of blocking light with wavelengths shorter than 400 nm or active energy rays with a wavelength of 405 nm obtained with an LED light source.

When the active energy ray-curable adhesive composition is visible ray-curable, the active energy ray-curable adhesive composition is preferably heated before irradiated with visible rays (heating before irradiation). In this case, the composition is preferably heated to 40° C. or higher, more preferably 50° C. or higher. The active energy ray-curable adhesive composition is also preferably heated after irradiated with visible rays (heating after irradiation). In this case, the composition is preferably heated to 40° C. or higher, more preferably 50° C. or higher.

An active energy ray-curable adhesive composition containing a photopolymerization initiator of formula (1) is particularly suitable for use in forming an adhesive layer to bond the polarizer and the transparent protective film with a 365 nm wavelength light transmittance of less than 5%. The active energy ray-curable adhesive composition containing the photopolymerization initiator of formula (1) shown above can form a cured adhesive layer by being irradiated with ultraviolet rays through the transparent protective film having the ability to absorb UV. In this case, the adhesive layer can be cured even in the polarizing film where the transparent protective films placed on both sides of the polarizer each have the ability to absorb UV. It will be understood, however, that the adhesive layer can be cured also in the polarizing film where the transparent protective films placed on the polarizer have no ability to absorb UV.

Methods for imparting the ability to absorb UV to the transparent protective film include a method of adding an ultraviolet absorber into the transparent protective film and a method of placing, on the surface of the transparent protective film, a surface treatment layer containing an ultraviolet absorber.

Examples of the ultraviolet absorber include conventionally known oxybenzophenone compounds, benzotriazole compounds, salicylate ester compounds, benzophenone compounds, cyanoacrylate compounds, nickel complex salt compounds, and triazine compounds.

When the polarizing film is manufactured according to the present invention using a continuous line, the line speed is preferably from 1 to 500 m/minute, more preferably from 5 to 300 m/minute, even more preferably from 10 to 100 m/minute, depending on the time required to cure the adhesive. If the line speed is too low, the productivity can be low, or damage to the transparent protective film can be too much, which can make it impossible to produce a polarizing film capable of withstanding durability tests and so on. If the line speed is too high, the adhesive can be insufficiently cured, so that the desired tackiness may fail to be obtained.

The polarizing film according to the present invention, which has the polarizer and the transparent protective film bonded with the adhesive layer interposed therebetween and made of a curing product of the active energy ray-curable adhesive composition, may further include an adhesion-facilitating layer between the transparent protective film and the adhesive layer. For example, the adhesion-facilitating layer may be made of any of various resins having a polyester skeleton, a polyether skeleton, a polycarbonate skeleton, a polyurethane skeleton, a silicone moiety, a polyamide skeleton, a polyimide skeleton, a polyvinyl alcohol skeleton, or other polymer skeletons. These polymer resins may be used singly or in combination of two or more. Other additives may also be added to form the adhesion-facilitating layer. More specifically, a tackifier, an ultraviolet absorber, an antioxidant, or a stabilizer such as a heat-resistant stabilizer may also be used to form the adhesion-facilitating layer.

Usually, the adhesion-facilitating layer is provided in advance on the transparent protective film, and then the adhesion-facilitating layer side of the transparent protective film is bonded to the polarizer with the adhesive layer. The adhesion-facilitating layer can be formed using a known technique that includes applying an adhesion-facilitating layer-forming material onto the transparent protective film and drying the material. The adhesion-facilitating layer-forming material is generally prepared in the form of a solution which is diluted to a suitable concentration taking into account the coating thickness after drying, the smoothness of the application, and other factors. After dried, the adhesion-facilitating layer preferably has a thickness of 0.01 to 5 µm, more preferably 0.02 to 2 µm, even more preferably 0.05 to 1 µm. Two or more adhesion-facilitating layers may be provided. Also in this case, the total thickness of the adhesion-facilitating layers preferably falls within such ranges.

When the active energy ray-curable adhesive composition for use in the present invention is formed, a compound represented by formula (1):

[Formula 3]

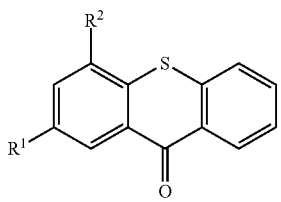

(1)

wherein $R^1$ and $R^2$ each represent —H, —$CH_2CH_3$, —IPr, or Cl, and $R^1$ and $R^2$ may be the same or different, is preferably used alone as a photopolymerization initiator, or the compound represented by formula (1) is preferably used as a photopolymerization initiator in combination with another photopolymerization initiator having high sensitivity to light of 380 nm or longer described below. The resulting tackiness is higher when the compound of formula (1) is used than when a photopolymerization initiator having high sensitivity to light of 380 nm or longer is used alone. In particular, the compound of formula (1) is preferably diethyl thioxanthone in which $R^1$ and $R^2$ are each —$CH_2CH_3$. When the total amount of the composition is normalized as 100% by weight, the content of the compound of formula (1) in the composition is preferably from 0.1 to 5.0% by weight, more preferably from 0.5 to 4.0% by weight, even more preferably from 0.9 to 3.0% by weight.

If necessary, a polymerization initiation aid is preferably added to the composition. In particular, the polymerization initiation aid is preferably triethylamine, diethylamine, N-methyldiethanolamine, ethanolamine, 4-dimethylaminobenzoic acid, methyl 4-dimethylaminobenzoate, ethyl 4-dimethylaminobenzoate, and isoamyl 4-dimethylaminobenzoate. Ethyl 4-dimethylaminobenzoate is particularly preferred. When the polymerization initiation aid is used, the content of the aid is generally 0 to 5% by weight, preferably 0 to 4% by weight, most preferably 0 to 3% by weight, when the total amount of the composition is normalized as 100% by weight.

If necessary, a known photopolymerization initiator may be used in combination. Since the transparent protective film having the ability to absorb UV does not transmit light of 380 nm or shorter, such a photopolymerization initiator should preferably have high sensitivity to light of 380 nm or longer. Examples of such an initiator include 2-methyl-1-(4-methylthiophenyl)-2-morpholinopropan-1-on, 2-benzyl-2-dimethylamino-1-(4-morpholinophenyl)-butanone-1,2-(dimethylamino)-2-[(4-methylphenyl)methyl]-1-[4-(4-morpholinyl)phenyl]-1-butanone, 2,4,6-trimethylbenzoyl-diphenyl-phosphine oxide, bis(2,4,6-trimethylbenzoyl)-phenylphosphine oxide, and bis(H5-2,4-cyclopentadien-1-yl)-bis(2,6-difluoro-3-(1H-pyrrol-1-yl)-phenyl)titanium.

In particular, a compound represented by formula (2):

[Formula 4]

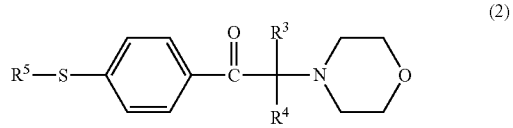

(2)

wherein $R^3$, $R^4$, and $R^5$ each represent —H, —$CH_3$, —$CH_2CH_3$, —IPr, or Cl, and $R^3$, $R^4$, and $R^5$ may be the same or different, is preferably used in addition to the photopolymerization initiator of formula (1). Commercially available 2-methyl-1-(4-methylthiophenyl)-2-morpholino-propan-1-on (IRGACURE 907 (trade name) manufactured by BASF) is advantageously used as the compound of formula (2). Besides this, 2-benzyl-2-dimethylamino-1-(4-morpholinophenyl)-butanone-1 (IRGACURE 369 (trade name) manufactured by BASF) and 2-(dimethylamino)-2-[(4-methylphenyl)methyl]-1-[4-(4-morpholinyl)phenyl]-1-butanone (IRGACURE 379 (trade name) manufactured by BASF) are preferred because of their high sensitivity.

The active energy ray-curable adhesive composition used in the present invention may contain a radically polymerizable compound (A) with an SP value of 29.0 $(MJ/m^3)^{1/2}$ to 32.0 $(MJ/m^3)^{1/2}$, a radically polymerizable compound (B) with an SP value of 18.0 $(MJ/m^3)^{1/2}$ to less than 21.0 $(MJ/m^3)^{1/2}$, a radically polymerizable compound (C) with an SP value of 21.0 $(MJ/m^3)^{1/2}$ to 23.0 $(MJ/m^3)^{1/2}$, and an acrylic oligomer (D) formed by polymerization of a (meth) acrylic monomer. When the total amount of the composition is normalized as 100% by weight, the composition contains 25 to 80% by weight of the radically polymerizable compound (B). As used herein, the term "the total amount of the composition" means the amount of all components including not only the radically polymerizable compounds but also any of various initiators and additives.

The radically polymerizable compound (A) may be any compound having a radically polymerizable group, such as a (meth)acrylate group, and having an SP value of 29.0 $(MJ/m^3)^{1/2}$ to 32.0 $(MJ/m^3)^{1/2}$. Examples of the radically polymerizable compound (A) include hydroxyethylacrylamide (29.6 in SP value) and N-methylolacrylamide (31.5 in SP value). As used herein, the term "a (meth)acrylate group" means an acrylate group and/or a methacrylate group.

The radically polymerizable compound (B) may be any compound having a radically polymerizable group, such as a (meth)acrylate group, and having an SP value of 18.0 $(MJ/m^3)^{1/2}$ to less than 21.0 $(MJ/m^3)^{1/2}$. Examples of the radically polymerizable compound (B) include tripropylene glycol diacrylate (19.0 in SP value), 1,9-nonanediol diacrylate (19.2 in SP value), tricyclodecanedimethanol diacrylate (20.3 in SP value), cyclic trimethylolpropane formalacrylate (19.1 in SP value), dioxane glycol diacrylate (19.4 in SP value), and EO-modified diglycerine tetraacrylate (20.9 in SP value). The radically polymerizable compound (B) may be advantageously a commercially available product, examples of which include Aronix M-220 (manufactured by Toagosei Co., Ltd., 19.0 in SP value), LIGHT ACRYLATE 1,9ND-A (manufactured by Kyoeisha Chemical Co., Ltd., 19.2 in SP value), LIGHT ACRYLATE DGE-4A (manufactured by Kyoeisha Chemical Co., Ltd., 20.9 in SP value), LIGHT ACRYLATE DCP-A (manufactured by Kyoeisha Chemical Co., Ltd., 20.3 in SP value), SR-531 (manufactured by Sartomer, 19.1 in SP value), and CD-536 (manufactured by Sartomer, 19.4 in SP value).

The radically polymerizable compound (C) may be any compound having a radically polymerizable group, such as a (meth)acrylate group, and having an SP value of 21.0 $(MJ/m^3)^{1/2}$ to 23.0 $(MJ/m^3)^{1/2}$. Examples of the radically polymerizable compound (C) include acryloylmorpholine (22.9 in SP value), N-methoxymethylacrylamide (22.9 in SP value), and N-ethoxymethylacrylamide (22.3 in SP value). The radically polymerizable compound (C) may be advantageously a commercially available product, examples of which include ACMO (manufactured by KOHJIN Film & Chemicals Co., Ltd., 22.9 in SP value), WASMER 2MA (manufactured by Kasano Kosan Co., Ltd., 22.9 in SP value), WASMER EMA (manufactured by Kasano Kosan Co., Ltd., 22.3 in SP value), and WASMER 3MA (manufactured by Kasano Kosan Co., Ltd., 22.4 in SP value).

When the radically polymerizable compounds (A), (B), and (C) are all capable of forming a homopolymer with a glass transition temperature (Tg) of 60° C. or higher, the adhesive layer can have a high Tg and particularly high durability. This makes it possible to prevent heat shock cracking of the polarizer, for example, when the compounds are used to form the adhesive layer between the polarizer and the transparent protective film. Herein, the Tg of a homopolymer of the radically polymerizable compound means the Tg of a product that can be obtained by curing (polymerizing) the radically polymerizable compound alone. How to measure the Tg will be described below.

In view of workability or uniformity during coating, the active energy ray-curable adhesive composition preferably has low viscosity. Therefore, the acrylic oligomer (D) formed by polymerization of a (meth)acrylic monomer also preferably has low viscosity. The acrylic oligomer that has low viscosity and can prevent curing shrinkage of the adhesive layer preferably has a weight average molecular weight (MW) of 15,000 or less, more preferably 10,000 or less, even more preferably 5,000 or less. On the other hand, to suppress curing shrinkage of the cured layer (adhesive layer) sufficiently, the acrylic oligomer (D) preferably has a weight average molecular weight (MW) of 500 or more, more preferably 1,000 or more, even more preferably 1,500 or more. Examples of the (meth)acrylic monomer used to form the acrylic oligomer (D) include (C1 to C20) alkyl (meth)acrylates such as methyl(meth)acrylate, ethyl(meth)acrylate, n-propyl(meth)acrylate, isopropyl(meth)acrylate, 2-methyl-2-nitropropyl(meth)acrylate, n-butyl(meth)acrylate, isobutyl(meth)acrylate, sec-butyl(meth)acrylate, tert-butyl(meth)acrylate, n-pentyl(meth)acrylate, tert-pentyl(meth)acrylate, 3-pentyl(meth)acrylate, 2,2-dimethylbutyl(meth)acrylate, n-hexyl(meth)acrylate, cetyl(meth)acrylate, n-octyl(meth)acrylate, 2-ethylhexyl(meth)acrylate, 4-methyl-2-propylpentyl(meth)acrylate, and n-octadecyl(meth)acrylate; cycloalkyl(meth)acrylates (e.g., cyclohexyl(meth)acrylate and cyclopentyl(meth)acrylate); aralkyl(meth)acrylates (e.g., benzyl(meth)acrylate); polycyclic (meth)acrylates (e.g., 2-isobornyl(meth)acrylate, 2-norbornylmethyl(meth)acrylate, 5-norbornen-2-yl-methyl(meth)acrylate, and 3-methyl-2-norbornylmethyl(meth)acrylate); hydroxyl group-containing (meth)acrylates (e.g., hydroxyethyl(meth)acrylate, 2-hydroxypropyl(meth)acrylate, and 2,3-dihydroxypropylmethyl-butyl(meth)acrylate); alkoxy group- or phenoxy group-containing (meth)acrylates (e.g., 2-methoxyethyl(meth)acrylate, 2-ethoxyethyl(meth)acrylate, 2-methoxymethoxyethyl(meth)acrylate, 3-methoxybutyl(meth)acrylate, ethylcarbitol(meth)acrylate, and phenoxyethyl(meth)acrylate); epoxy group-containing (meth)acrylates (e.g., glycidyl(meth)acrylate), halogen-containing (meth)acrylates (e.g., 2,2,2-trifluoroethyl(meth)acrylate, 2,2,2-trifluoroethylethyl(meth)acrylate, tetrafluoropropyl(meth)acrylate, hexafluoropropyl(meth)acrylate, octafluoropentyl(meth)acrylate, and heptadecafluorodecyl(meth)acrylate); and alkylaminoalkyl(meth)acrylates (e.g., dimethylaminoethyl(meth)acrylate). These (meth)acrylates may be used singly or in combination of two or more. Examples of the acrylic oligomer (D) include ARUFON manufactured by Toagosei Co., Ltd., Actflow manufactured by Soken Chemical & Engineering Co., Ltd., and JONCRYL manufactured by BASF Japan Ltd.

The active energy ray-curable adhesive composition preferably further contains a radically polymerizable compound having an active methylene group and a radical polymerization initiator (E) having a hydrogen-withdrawing function.

The radically polymerizable compound having an active methylene group should be a compound having an active double-bond group such as a (meth)acrylic group at its end or in its molecule and also having an active methylene group. For example, the active methylene group may be an acetoacetyl group, an alkoxymalonyl group, or a cyanoacetyl group. Examples of the radically polymerizable compound having an active methylene group include acetoacetoxyalkyl(meth)acrylates such as 2-acetoacetoxyethyl(meth)acrylate, 2-acetoacetoxypropyl(meth)acrylate, and 2-acetoacetoxy-1-methylethyl(meth)acrylate; 2-ethoxymalonyloxyethyl(meth)acrylate, 2-cyanoacetoxyethyl(meth)acrylate, N-(2-cyanoacetoxyethyl)acrylamide, N-(2-propionylacetoxybutyl)acrylamide, N-(4-acetoacetoxymethylbenzyl)acrylamide, and N-(2-acetoacetylaminoethyl)acrylamide. The radically polymerizable compound having an active methylene group may have any SP value.

In the present invention, for example, the radical polymerization initiator (E) having a hydrogen-withdrawing function may be a thioxanthone radical polymerization initiator or a benzophenone radical polymerization initiator. For example, the thioxanthone radical polymerization initiator may be the compound of formula (1) shown above. Examples of the compound of formula (1) include thioxanthone, dimethyl thioxanthone, diethyl thioxanthone, isopropyl thioxanthone, and chlorothioxanthone. In particular, the compound of formula (1) is preferably diethyl thioxanthone in which $R^1$ and $R^2$ are each —$CH_2CH_3$.

In the present invention, as described above, the reaction of the radically polymerizable compound having an active methylene group in the presence of the radical polymerization initiator (E) having a hydrogen-withdrawing function produces a radical on the methylene group, which reacts with the hydroxyl group in the polarizer made of PVA or the like to form a covalent bond. Thus to produce a radical on the methylene group of the radically polymerizable compound having an active methylene group so that the covalent bond can be sufficiently formed, the composition preferably contains 1 to 50% by weight of the radically polymerizable compound having an active methylene group and 0.1 to 5.0% by weight of the radical polymerization initiator (E), and more preferably contains 3 to 30% by weight of the radically polymerizable compound having an active methylene group and 0.5 to 4.0% by weight of the radical polymerization initiator (E), when the total amount of the composition is normalized as 100% by weight. In particular, the composition preferably contains 0.9 to 3.0% by weight of the radical polymerization initiator (E). If the content of the radically polymerizable compound having an active methylene group is less than 1% by weight, the effect of increasing the tackiness in an undried state can be low, and water resistance may fail to improve sufficiently. If it is more than 50% by weight, the adhesive layer may be insufficiently cured. If the content of the radical polymerization initiator (E) having a hydrogen-withdrawing function is less than 0.1% by weight, the hydrogen-withdrawing reaction may fail to proceed sufficiently. If it is more than 5.0% by weight, the initiator (E) may fail to dissolve completely in the composition.

The active energy ray-curable adhesive composition used in the present invention should contain 25 to 80% by weight of the radically polymerizable compound (B) when the total amount of the composition is normalized as 100% by weight. The active energy ray-curable adhesive composition preferably further contains 3 to 40% by weight of the radically polymerizable compound (A), 5 to 55% by weight of the radically polymerizable compound (C), and 3 to 20% by weight of the acrylic oligomer (D), when the total amount of the composition is normalized as 100% by weight.

The active energy ray-curable adhesive composition used in the present invention may also contain any of various additives as other optional components as long as the objects and effects of the present invention are not impaired. Examples of such additives include polymers or oligomers such as epoxy resin, polyamide, polyamide imide, polyurethane, polybutadiene, polychloroprene, polyether, polyester, styrene-butadiene block copolymers, petroleum resin, xylene resin, ketone resin, cellulose resin, fluorooligomers, silicone oligomers, and polysulfide oligomers, polymerization inhibitors such as phenothiazine and 2,6-di-tert-butyl-4-methylphenol, polymerization initiation aids, leveling agents, wettability modifiers, surfactants, plasticizers, ultraviolet absorbers, silane coupling agents, inorganic fillers, pigments, and dyes.

Among these additives, silane coupling agents can impart higher water resistance by acting on the surface of the polarizer. When a silane coupling agent is used, the content of the silane coupling agent is generally 0 to 10% by weight, preferably 0 to 5% by weight, most preferably 0 to 3% by weight, when the total amount of the composition is normalized as 100% by weight.

The silane coupling agent to be used is preferably an active energy ray-curable compound. However, even when it is not active energy racy-curable, it can also impart a similar level of water resistance.

Examples of silane coupling agents as active energy ray-curable compounds include vinyltrichlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, and 3-acryloxypropyltrimethoxysilane.

Examples of non-active-energy-ray-curable silane coupling agents include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, N-(vinylbenzyl)-2-aminoethyl-3-aminopropyltrimethoxysilane hydrochloride, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanatopropyltriethoxysilane, and imidazolesilane.

Preferred are 3-methacryloxypropyltrimethoxysilane and 3-acryloxypropyltrimethoxysilane.

The adhesive layer made from the active energy ray-curable adhesive composition has durability higher than that of an aqueous adhesive layer. In the present invention, the adhesive layer used preferably has a Tg of 60° C. or higher. The thickness of the adhesive layer is preferably controlled to 0.01 to 7 µm. Thus, when the polarizing film according to the present invention is manufactured in such a way that the active energy ray-curable adhesive composition used is capable of forming an adhesive layer with a high Tg of 60° C. or higher and the thickness of the adhesive layer is controlled to fall within the range, the polarizing film can have satisfactory durability in a severe environment at high temperate and high humidity. In view of the durability of the polarizing film, mathematical expression (1): A−12×B>58 is preferably satisfied, wherein A is the Tg (° C.) of the adhesive layer, and B is the thickness (µm) of the adhesive layer.

As shown above, the active energy ray-curable adhesive composition is preferably so selected that the adhesive layer to be made from it will have a Tg of 60° C. or higher, more preferably 70° C. or higher, even more preferably 75° C. or higher, further more preferably 100° C. or higher, still more preferably 120° C. or higher. On the other hand, if the adhesive layer has too high a Tg, the polarizing film can have low flexibility. Thus, the Tg of the adhesive layer is preferably 300° C. or lower, more preferably 240° C. or lower, even more preferably 180° C. or lower.

As mentioned above, the adhesive layer preferably has a thickness of 0.01 to 7 µm, more preferably 0.01 to 5 µm, even more preferably 0.01 to 2 µm, most preferably 0.01 to 1 µm. If the thickness of the adhesive layer is less than 0.01 µm, the adhesive itself may fail to have a cohesive strength, and a necessary bonding strength may fail to be obtained. On the other hand, if the thickness of the adhesive layer is more than 7 µm, the polarizing film can have insufficient durability.

The polarizing film according to the present invention includes a polarizer and transparent protective films bonded to both sides of the polarizer with an adhesive layer interposed between the polarizer and each transparent protective film and made of a curing product of the active energy ray-curable adhesive composition.

Any of various polarizers may be used without restriction. For example, the polarizer may be a product produced by a process including adsorbing a dichroic material such as iodine or a dichroic dye to a hydrophilic polymer film such as a polyvinyl alcohol-based film, a partially-formalized polyvinyl alcohol-based film, or a partially-saponified, ethylene-vinyl acetate copolymer-based film and uniaxially stretching the film or may be a polyene-based oriented film such as a film of a dehydration product of polyvinyl alcohol or a dehydrochlorination product of polyvinyl chloride. In particular, a polarizer including a polyvinyl alcohol-based film and a dichroic material such as iodine is advantageous. The thickness of the polarizer is generally, but not limited to, about 80 µm or less.

For example, a polarizer including a uniaxially-stretched polyvinyl alcohol-based film dyed with iodine can be produced by a process including immersing a polyvinyl alcohol film in an aqueous iodine solution to dye the film and stretching the film to 3 to 7 times the original length. If necessary, the film may also be immersed in an aqueous solution of boric acid or potassium iodide or the like. If necessary, the polyvinyl alcohol-based film may be further immersed in water for washing before it is dyed. If the polyvinyl alcohol-based film is washed with water, dirt and any anti-blocking agent can be cleaned from the surface of the polyvinyl alcohol-based film, and the polyvinyl alcohol-based film can also be allowed to swell so that unevenness such as uneven dyeing can be effectively prevented. The film may be stretched before, while, or after it is dyed with iodine. The film may also be stretched in an aqueous solution of boric acid, potassium iodide, or the like or in a water bath.

A thin polarizer with a thickness of 10 μm or less may also be used. In view of thickness reduction, the thickness is preferably from 1 to 7 μm. Such a thin polarizer is less uneven in thickness, has good visibility, and is less dimensionally-variable, and thus has high durability. It is also preferred because it can form a thinner polarizing film. The thin polarizer is also advantageously used as a polarizer with a moisture content of less than 15% because its moisture content can be easily reduced during drying by heating.

Typical examples of such a thin polarizer include the thin polarizing films described in JP-A-51-069644, JP-A-2000-338329, WO2010/100917, PCT/JP2010/001460, Japanese Patent Application No. 2010-269002, and Japanese Patent Application No. 2010-263692. These thin polarizing films can be obtained by a process including the steps of stretching a laminate of a polyvinyl alcohol-based resin (hereinafter also referred to as PVA-based resin) layer and a stretchable resin substrate and dyeing the laminate. Using this process, the PVA-based resin layer, even when thin, can be stretched without problems such as breakage by stretching, because the layer is supported on the stretchable resin substrate.

Among processes including the steps of stretching and dyeing a laminate, a process capable of achieving high-ratio stretching to improve polarizing performance is preferably used when the thin polarizing film is formed. Thus, the thin polarizing film is preferably obtained by a process including the step of stretching in an aqueous boric acid solution as described in WO2010/100917, PCT/JP2010/001460, Japanese Patent Application No. 2010-269002, or Japanese Patent Application No. 2010-263692, and more preferably obtained by a process including the step of performing auxiliary in-air stretching before stretching in an aqueous boric acid solution as described in Japanese Patent Application No. 2010-269002 or 2010-263692.

PCT/JP2010/001460 describes a thin highly-functional polarizing film that is formed integrally with a resin substrate, made of a PVA-based resin containing an oriented dichroic material, and has a thickness of 7 μm or less and the optical properties of a single transmittance of 42.0% or more and a degree of polarization of 99.95% or more.

This thin highly-functional polarizing film can be produced by a process including forming a PVA-based resin coating on a resin substrate with a thickness of at least 20 μm, drying the coating to form a PVA-based resin layer, immersing the resulting PVA-based resin layer in a dyeing liquid containing a dichroic material to adsorb the dichroic material to the PVA-based resin layer, and stretching the PVA-based resin layer, which contains the adsorbed dichroic material, with the resin substrate in an aqueous boric acid solution to a total stretch ratio of 5 times or more the original length.

A laminated film including a thin highly-functional polarizing film containing an oriented dichroic material can also be produced by a method including the steps of: applying a PVA-based resin-containing aqueous solution to one side of a resin substrate with a thickness of at least 20 μm, drying the coating to form a PVA-based resin layer so that a laminated film including the resin substrate and the PVA-based resin layer formed thereon is produced; immersing the laminated film in a dyeing liquid containing a dichroic material to adsorb the dichroic material to the PVA-based resin layer in the laminated film, wherein the laminated film includes the resin substrate and the PVA-based resin layer formed on one side of the resin substrate; and stretching the laminated film, which has the PVA-based resin layer containing the adsorbed dichroic material, in an aqueous boric acid solution to a total stretch ratio of 5 times or more the original length, wherein the PVA-based resin layer containing the adsorbed dichroic material is stretched with the resin substrate, so that a laminated film including the resin substrate and a thin highly-functional polarizing film formed on one side of the resin substrate is produced, in which the thin highly-functional polarizing film is made of the PVA-based resin layer containing the oriented dichroic material and has a thickness of 7 μm or less and the optical properties of a single transmittance of 42.0% or more and a degree of polarization of 99.95% or more.

The thin polarizing film disclosed in Japanese Patent Application No. 2010-269002 or 2010-263692 is a polarizing film in the form of a continuous web including a PVA-based resin containing an oriented dichroic material, which is made with a thickness of 10 μm or less by a two-stage stretching process including auxiliary in-air stretching of a laminate and stretching of the laminate in an aqueous boric acid solution, wherein the laminate includes an amorphous polyester-based thermoplastic resin substrate and a PVA-based resin layer formed thereon. This thin polarizing film is preferably made to have optical properties satisfying the following conditions: $P > -(100.929T - 42.4 - 1) \times 100$ (provided that $T < 42.3$) and $P \geq 99.9$ (provided that $T \geq 42.3$), wherein T represents the single transmittance, and P represents the degree of polarization.

Specifically, the thin polarizing film can be produced by a thin polarizing film-manufacturing method including the steps of: performing elevated temperature in-air stretching of a PVA-based resin layer formed on an amorphous polyester-based thermoplastic resin substrate in the form of a continuous web, so that a stretched intermediate product including an oriented PVA-based resin layer is produced; adsorbing a dichroic material (which is preferably iodine or a mixture of iodine and an organic dye) to the stretched intermediate product to produce a dyed intermediate product including the PVA-based resin layer and the dichroic material oriented therein; and performing stretching of the dyed intermediate product in an aqueous boric acid solution so that a polarizing film with a thickness of 10 μm or less is produced, which includes the PVA-based resin layer and the dichroic material oriented therein.

In this manufacturing method, the elevated temperature in-air stretching and the stretching in an aqueous boric acid solution are preferably performed in such a manner that the PVA-based resin layer formed on the amorphous polyester-based thermoplastic resin substrate is stretched to a total stretch ratio of 5 times or more. The temperature of the aqueous boric acid solution for the stretching therein may be 60° C. or higher. Before stretched in the aqueous boric acid solution, the dyed intermediate product is preferably subjected to an insolubilization treatment, in which the dyed intermediate product is preferably immersed in an aqueous boric acid solution at a temperature of 40° C. or less. The amorphous polyester-based thermoplastic resin substrate may be made of amorphous polyethylene terephthalate including co-polyethylene terephthalate in which isophthalic acid, cyclohexanedimethanol, or any other monomer is copolymerized. The amorphous polyester-based thermoplastic resin substrate is preferably made of a transparent resin. The thickness of the substrate may be at least seven times the thickness of the PVA-based resin layer to be formed. The elevated temperature in-air stretching is preferably performed at a stretch ratio of 3.5 times or less. The temperature of the elevated temperature in-air stretching is preferably equal to or higher than the glass transition temperature of the PVA-based resin. Specifically, it is preferably in the range of 95° C. to 150° C. When the elevated temperature in-air stretching is end-free uniaxial stretching, the PVA-based resin layer formed on the amorphous polyester-based thermoplastic resin substrate is preferably stretched to a total stretch ratio of 5 to 7.5 times. When the elevated temperature in-air stretching is fixed-end uniaxial stretching, the PVA-based resin layer formed on the amorphous polyester-based thermoplastic resin substrate is preferably stretched to a total stretch ratio of 5 to 8.5 times. More specifically, the thin polarizing film can be produced by the method described below.

A substrate is prepared in the form of a continuous web, which is made of co-polyethylene terephthalate-isophthalate (amorphous PET) containing 6 mol % of copolymerized isophthalic acid. The amorphous PET has a glass transition temperature of 75° C. A laminate of a polyvinyl alcohol (PVA) layer and the amorphous PET substrate in the form of a continuous web is prepared as described below. For reference, the glass transition temperature of PVA is 80° C.

A 200-μm-thick amorphous PET substrate is provided, and an aqueous 4-5% PVA solution is prepared by dissolving PVA powder with a polymerization degree of 1,000 or more and a saponification degree of 99% or more in water. Subsequently, the aqueous PVA solution is applied to the 200-μm-thick amorphous PET substrate and dried at a temperature of 50 to 60° C. so that a laminate composed of the amorphous PET substrate and a 7-μm-thick PVA layer formed thereon is obtained.

The laminate having the 7-μm-thick PVA layer is subjected to a two-stage stretching process including auxiliary in-air stretching and stretching in an aqueous boric acid solution as described below, so that a thin highly-functional polarizing film with a thickness of 3 μm is obtained. At the first stage, the laminate having the 7-μm-thick PVA layer is subjected to an auxiliary in-air stretching step so that the layer is stretched with the amorphous PET substrate to form a stretched laminate having a 5-μm-thick PVA layer. Specifically, the stretched laminate is formed by a process including feeding the laminate having the 7-μm-thick PVA layer to a stretching apparatus placed in an oven with the stretching temperature environment set at 130° C. and subjecting the laminate to end-free uniaxial stretching to a stretch ratio of 1.8 times. In the stretched laminate, the PVA layer is modified, by the stretching, into a 5-μm-thick PVA layer containing oriented PVA molecules.

Subsequently, a dyeing step is performed to produce a dyed laminate having a 5-μm-thick PVA layer containing oriented PVA molecules and adsorbed iodine. Specifically, the dyed laminate is produced by immersing the stretched laminate for a certain period of time in a dyeing liquid containing iodine and potassium iodide and having a temperature of 30° C. so that iodine can be adsorbed to the PVA layer of the stretched laminate and so that the PVA layer for finally forming a highly-functional polarizing film can have a single transmittance of 40 to 44%. In this step, the dyeing liquid contains water as a solvent and has an iodine concentration in the range of 0.12 to 0.30% by weight and a potassium iodide concentration in the range of 0.7 to 2.1% by weight. The concentration ratio of iodine to potassium iodide is 1:7. It should be noted that potassium iodide is necessary to make iodine soluble in water. More specifically, the stretched laminate is immersed for 60 seconds in a dyeing liquid containing 0.30% by weight of iodine and 2.1% by weight of potassium iodide, so that a dyed laminate is produced, in which the 5-μm-thick PVA layer contains oriented PVA molecules and adsorbed iodine.

At the second stage, the dyed laminate is further subjected to a stretching step in an aqueous boric acid solution so that the layer is further stretched with the amorphous PET substrate to form an optical film laminate having a 3-μm-thick PVA layer, which forms a highly-functional polarizing film. Specifically, the optical film laminate is formed by a process including feeding the dyed laminate to a stretching apparatus placed in a treatment system where an aqueous boric acid solution containing boric acid and potassium iodide is set in the temperature range of 60 to 85° C., and subjecting the laminate to end-free uniaxial stretching to a stretch ratio of 3.3 times. More specifically, the aqueous boric acid solution has a temperature of 65° C. In the solution, the boric acid content and the potassium iodide content are 4 parts by weight and 5 parts by weight, respectively, based on 100 parts by weight of water. In this step, the dyed laminate having a controlled amount of adsorbed iodine is first immersed in the aqueous boric acid solution for 5 to 10 seconds. Subsequently, the dyed laminate is directly fed between a plurality of pairs of rolls different in peripheral speed, which form the stretching apparatus placed in the treatment system, and subjected to end-free uniaxial stretching for 30 to 90 seconds to a stretch ratio of 3.3 times. This stretching treatment converts the PVA layer of the dyed laminate to a 3-μm-thick PVA layer in which the adsorbed iodine forms a polyiodide ion complex highly oriented in a single direction. This PVA layer forms a highly-functional polarizing film in the optical film laminate.

A cleaning step, although not essential for the manufacture of the optical film laminate, is preferably performed, in which the optical film laminate is taken out of the aqueous boric acid solution, and boric acid deposited on the surface of the 3-μm-thick PVA layer formed on the amorphous PET substrate is washed off with an aqueous potassium iodide solution. Subsequently, the cleaned optical film laminate is dried in a drying step using warm air at 60° C. It should be noted that the cleaning step is to prevent appearance defects such as boric acid precipitation.

A lamination and/or transfer step, although not essential for the manufacture of the optical film laminate, may also be performed, in which an 80-μm-thick triacetylcellulose film is bonded to the surface of the 3-μm-thick PVA layer on the amorphous PET substrate, while an adhesive is applied to the surface, and then the amorphous PET substrate is peeled off, so that the 3-μm-thick PVA layer is transferred onto the 80-μm-thick triacetylcellulose film.

[Other Steps]

The thin polarizing film-manufacturing method may include other steps in addition to the above steps. For example, such other steps may include an insolubilization step, a crosslinking step, a drying step (moisture control), etc. Other steps may be performed at any appropriate timing.

The insolubilization step is typically achieved by immersing the PVA-based resin layer in an aqueous boric acid solution. The insolubilization treatment can impart water resistance to the PVA-based resin layer. The concentration of boric acid in the aqueous boric acid solution is preferably from 1 to 4 parts by weight based on 100 parts by weight of water. The insolubilization bath (aqueous boric acid solution) preferably has a temperature of 20° C. to 50° C. Preferably, the insolubilization step is performed after the preparation of the laminate and before the dyeing step or the step of stretching in water.

The crosslinking step is typically achieved by immersing the PVA-based resin layer in an aqueous boric acid solution. The crosslinking treatment can impart water resistance to the PVA-based resin layer. The concentration of boric acid in the aqueous boric acid solution is preferably from 1 to 4 parts by weight based on 100 parts by weight of water. When the crosslinking step is performed after the dyeing step, an iodide is preferably added to the solution. The addition of an iodide can suppress the elution of adsorbed iodine from the PVA-based resin layer. The amount of the addition of an iodide is preferably from 1 to 5 parts by weight based on 100 parts by weight of water. Examples of the iodide include those listed above. The temperature of the crosslinking bath (aqueous boric acid solution) is preferably from 20° C. to 50° C. Preferably, the crosslinking step is performed before the second stretching step in the aqueous boric acid solution. In a preferred embodiment, the dyeing step, the crosslinking step, and the second stretching step in the aqueous boric acid solution are performed in this order.

Figure 3:
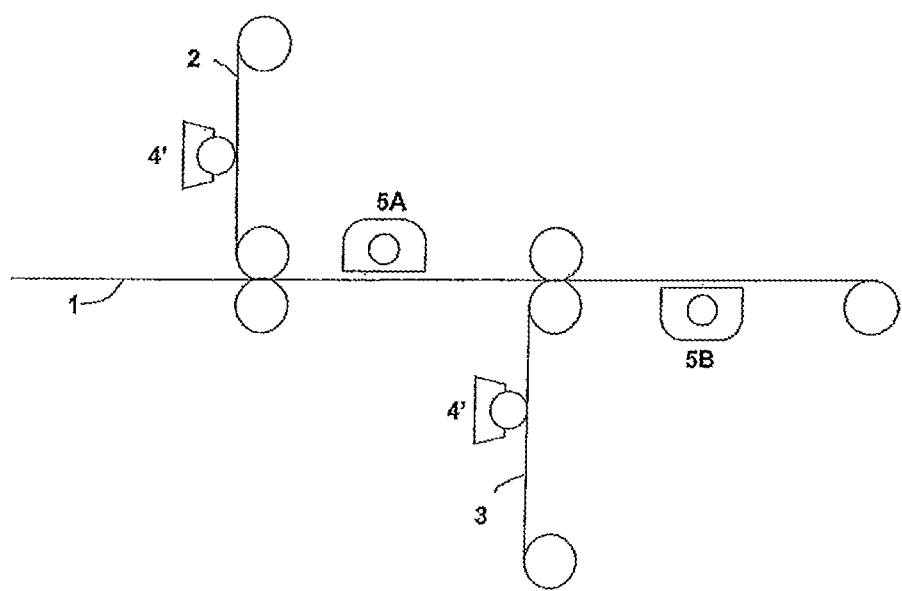
FIG. 3 is a schematic diagram showing an example of the method of the present invention for manufacturing a polarizing film having a thin polarizer.

In the method of the present invention for manufacturing a polarizing film, a thin polarizer produced in the form of a film on a resin substrate can be advantageously used as the polarizer. FIG. 3 shows an example of the method of the present invention for manufacturing a polarizing film having such a thin polarizer. In the example shown in FIG. 3, a first applying step and a first laminating step are performed, in which the first applying step includes applying an active energy ray-curable adhesive composition to the surface of a first transparent protective film 2 to be bonded to a thin polarizer 1, and the first laminating step includes laminating the first transparent protective film 2 to the thin polarizer 1 of a laminated film including a resin substrate and the thin polarizer 1 placed thereon (the resin substrate placed on the undersurface of the thin polarizer 1 is omitted for convenience in FIG. 3). Subsequently, the first transparent protective film 2 is first irradiated with active energy rays by means of an active energy ray irradiator 5A, so that the thin polarizer 1 and the first transparent protective film 2 are bonded together (first bonding step). Subsequently, the resin substrate is peeled off from the thin polarizer 1 (peeling step). Subsequently, a second applying step and a second laminating step are performed, in which the second applying step includes applying an active energy ray-curable adhesive composition to the surface of a second transparent protective film 3 to be bonded to the thin polarizer 1, and the second laminating step includes laminating the second transparent protective film 3 to the surface of the thin polarizer 1 on the side where the resin substrate has been peeled off from the thin polarizer 1. Subsequently, the second transparent protective film 3 is irradiated with active energy rays by means of an active energy ray irradiator 5B, so that the thin polarizer 1 and the second transparent protective film 3 are bonded together (second bonding step). Thus, a polarizing film having the thin polarizer 1 is successfully manufactured.

The material used to form the transparent protective film or films provided on one or both sides of the polarizer preferably has a high level of transparency, mechanical strength, thermal stability, water blocking properties, isotropy, etc. In particular, the material used to form the transparent protective film or films preferably has a water-vapor permeability of 150 g/m$^2$/24 hours or less, more preferably 140 g/m$^2$/24 hours or less, even more preferably 120 g/m$^2$/24 hours or less. The water-vapor permeability can be determined by the method described in Examples.

The thickness of the transparent protective film may be determined as appropriate. The transparent protective film generally has a thickness of about 1 to about 500 μm, preferably 1 to 300 μm, more preferably 5 to 200 μm, in view of strength, workability such as handleability, thin layer formability, or the like. The thickness of the transparent protective film is even more preferably from 10 to 200 μm, further more preferably from 20 to 80 μm.

Examples of materials that may be used to form the transparent protective film with a satisfactorily low level of water-vapor permeability as mentioned above include polyester resin such as polyethylene terephthalate or polyethylene naphthalate, polycarbonate resin, arylate resin, amide resin such as nylon or aromatic polyamide, polyolefin polymers such as polyethylene, polypropylene, and ethylene-propylene copolymers, cyclic olefin-based resin having a cyclo-structure or a norbornene structure, (meth)acrylic resin, or any blend thereof. Among these resins, polycarbonate resin, cyclic polyolefin resin, or (meth)acrylic resin is preferred, and cyclic polyolefin resin or (meth)acrylic resin is particularly preferred.

For example, the cyclic polyolefin resin is preferably a norbornene resin. Cyclic olefin resin is a generic name for resins produced by polymerization of cyclic olefin used as a polymerizable unit, and examples thereof include the resins described in JP-A-01-240517, JP-A-03-14882, and JP-A-03-122137. Specific examples thereof include ring-opened (co)polymers of cyclic olefins, addition polymers of cyclic olefins, copolymers (typically random copolymers) of cyclic olefin and α-olefin such as ethylene or propylene, graft polymers produced by modification thereof with unsaturated carboxylic acids or derivatives thereof, and hydrides thereof. Examples of the cyclic olefin include norbornene monomers.

Cyclic polyolefin resins have various commercially available sources. Examples thereof include ZEONEX (trade name) and ZEONOR (trade name) series manufactured by ZEON CORPORATION, ARTON (trade name) series manufactured by JSR CORPORATION, TOPAS (trade name) series manufactured by Ticona, and APEL (trade name) series manufactured by Mitsui Chemicals, Inc.

The (meth)acrylic resin preferably has a glass transition temperature (Tg) of 115° C. or higher, more preferably 120° C. or higher, even more preferably 125° C. or higher, still more preferably 130° C. or higher. If the Tg is 115° C. or higher, the resulting polarizing plate can have high durability. The upper limit to the Tg of the (meth)acrylic resin is preferably, but not limited to, 170° C. or lower, in view of formability or the like. The (meth)acrylic resin can forma film with an in-plane retardation (Re) of almost zero and a thickness direction retardation (RTH) of almost zero.

Any appropriate (meth)acrylic resin may be used as long as the effects of the present invention are not impaired. Examples of such a (meth)acrylic resin include poly(meth)acrylate such as poly(methyl methacrylate), methyl methacrylate-(meth)acrylic acid copolymers, methyl methacrylate-(meth)acrylic ester copolymers, methyl methacrylate-acrylic ester-(meth)acrylic acid copolymers, methyl(meth) acrylate-styrene copolymers (such as MS resins), and alicyclic hydrocarbon group-containing polymers (such as methyl methacrylate-cyclohexyl methacrylate copolymers and methyl methacrylate-norbornyl(meth)acrylate copolymers). Poly(C1 to C6 alkyl(meth)acrylate) such as poly (methyl(meth)acrylate) is preferred. A methyl methacrylate-based resin composed mainly of a methyl methacrylate unit (50 to 100% by weight, preferably 70 to 100% by weight) is more preferred.

Examples of the (meth)acrylic resin include ACRYPET VH and ACRYPET VRL20A each manufactured by MITSUBISHI RAYON CO., Ltd., and the (meth)acrylic resins described in JP-A-2004-70296 including(meth)acrylic resins having a ring structure in their molecule, and high-Tg (meth)acrylic resins obtained by intramolecular crosslinking or intramolecular cyclization reaction.

Lactone ring structure-containing (meth)acrylic resins may also be used. This is because they have high heat resistance and high transparency and also have high mechanical strength after biaxially stretched.

Examples of the lactone ring structure-containing (meth) acrylic reins include the lactone ring structure-containing (meth)acrylic reins described in JP-A-2000-230016, JP-A-2001-151814, JP-A-2002-120326, JP-A-2002-254544, and JP-A-2005-146084.

The low-water-vapor-permeability transparent protective films provided on both front and back sides of the polarizer may be made of the same polymer material or different polymer materials.

A retardation plate having an in-plane retardation of 40 nm or more and/or a thickness direction retardation of 80 nm or more may be used as the transparent protective film. The in-plane retardation is generally controlled to fall within the range of 40 to 200 nm, and the thickness direction retardation is generally controlled to fall within the range of 80 to 300 nm. The use of a retardation plate as the transparent protective film makes it possible to reduce the thickness because the retardation plate also functions as the transparent protective film.

Examples of the retardation plate include a birefringent film produced by uniaxially or biaxially stretching a polymer material, an oriented liquid crystal polymer film, and an oriented liquid crystal polymer layer supported on a film. While the thickness of the retardation plate is also not restricted, it is generally from about 20 to about 150 µm.

Alternatively, a film with a retardation may be bonded to a separate transparent protective film with no retardation, so that the retardation function can be imparted to the transparent protective film.

The surface of the transparent protective film, opposite to its surface where the polarizer is to be bonded, may be provided with a functional layer such as a hard coat layer, an anti-reflection layer, an anti-sticking layer, a diffusion layer, or an antiglare layer. The functional layer such as a hard coat layer, an anti-reflection layer, an anti-sticking layer, a diffusion layer, or an antiglare layer may be provided as part of the transparent protective film itself or as a layer independent of the transparent protective film.

For practical use, the polarizing film according to the present invention may be laminated with any other optical layer or layers to form an optical film. As a non-limiting example, such an optical layer or layers may be one or more optical layers that have ever been used to form liquid crystal display devices, etc., such as a reflector, a transflector, a retardation plate (including a wavelength plate such as a half or quarter wavelength plate), or a viewing angle compensation film. Particularly preferred is a reflective or transflective polarizing film including a laminate of the polarizing film according to the present invention and a reflector or a transflector, an elliptically or circularly polarizing film including a laminate of the polarizing film according to the present invention and a retardation plate, a wide viewing angle polarizing film including a laminate of the polarizing film according to the present invention and a viewing angle compensation film, or a polarizing film including a laminate of the polarizing film according to the present invention and a brightness enhancement film.

The optical film including a laminate of the polarizing film and the optical layer may be formed by a method of stacking them one by one in the process of manufacturing a liquid crystal display device or the like. However, an optical film formed in advance by lamination is advantageous in that it can facilitate the process of manufacturing a liquid crystal display device or the like, because it has stable quality and good assembling workability. In the lamination, any appropriate bonding means such as a pressure-sensitive adhesive layer may be used. When the polarizing film and any other optical film are bonded together, their optical axes may be each aligned at an appropriate angle, depending on the desired retardation properties or other desired properties.

A pressure-sensitive adhesive layer for bonding to any other member such as a liquid crystal cell may also be provided on the polarizing film or the optical film including a laminate having at least one layer of the polarizing film. As a non-limiting example, the pressure-sensitive adhesive for use in forming the pressure-sensitive adhesive layer may be appropriately selected from pressure-sensitive adhesives containing, as a base polymer, an acryl-based polymer, a silicone-based polymer, polyester, polyurethane, polyamide, polyether, a fluoropolymer, or a rubber polymer. In particular, a pressure-sensitive adhesive having a high level of optical transparency, weather resistance, and heat resistance and exhibiting an appropriate degree of wettability, cohesiveness, and tackiness is preferably used, such as an acrylic pressure-sensitive adhesive.

The pressure-sensitive adhesive layer may also be formed as a laminate of layers different in composition, type or other features on one or both sides of the polarizing film or the optical film. When pressure-sensitive adhesive layers are provided on both front and back sides of the polarizing plate or the optical film, they may be different in composition, type, thickness, or other features. The thickness of the pressure-sensitive adhesive layer may be determined depending on the intended use, adhering strength, or other factors, and is generally from 1 to 500 µm, preferably from 1 to 200 µm, more preferably from 1 to 100 µm.

The exposed surface of the pressure-sensitive adhesive layer may be temporarily covered with a separator for anti-pollution or other purposes until it is actually used. This can prevent contact with the pressure-sensitive adhesive layer during usual handling. According to conventional techniques, an appropriate separator may be used, such as a plastic film, a rubber sheet, a paper sheet, a cloth, a nonwoven fabric, a net, a foam sheet, a metal foil, any laminate thereof, or any other appropriate thin material, which is optionally coated with any appropriate release agent such as a silicone, long-chain alkyl, or fluoride release agent, or molybdenum sulfide.

The polarizing film or optical film according to the present invention is preferably used to form various devices such as liquid crystal display devices. Liquid crystal display devices may be formed according to conventional techniques. Specifically, a liquid crystal display device may be typically formed by appropriately assembling a liquid crystal cell, polarizing films or optical films, and an optional component such as a lighting system, and incorporating a driving circuit according to any conventional techniques, except that the polarizing films or optical films used are according to the present invention. The liquid crystal cell to be used may also be of any type such as TN type, STN type, or II type.

Any desired liquid crystal display device may be formed, such as a liquid crystal display device including a liquid crystal cell and the polarizing or optical film or films placed on one or both sides of the liquid crystal cell or a liquid crystal display device further including a backlight or a reflector in a lighting system. In such a case, the polarizing or optical film or films according to the present invention may be placed on one or both sides of the liquid crystal cell. When the polarizing or optical films are provided on both sides, they may be the same or different. The process of forming a liquid crystal display device may also include placing an appropriate component such as a diffusion plate, an antiglare layer, an anti-reflection film, a protective plate, a prism array, a lens array sheet, a light diffusion plate, or a backlight in one or more layers at an appropriate position or positions.

EXAMPLES

Hereinafter, examples of the present invention will be described, which, however, should not be construed as limiting the embodiments of the present invention.
<Glass Transition Temperature (Tg)>
The Tg was measured with a dynamic viscoelastometer RSA-III manufactured by TA Instruments under the following conditions.
Sample size: 10 mm wide, 30 mm long;
clamp distance: 20 mm;
measurement mode: tensile mode; frequency: 1 Hz; rate of temperature rise: 5° C./minute. The dynamic viscoelasticity was measured, and the tan δ peak temperature was used as the Tg.
<Water-Vapor Permeability of Transparent Protective Film>
The water-vapor permeability was measured using the water-vapor permeability test (cup method) according to JIS Z 0208. A cut piece sample with a diameter of 60 mm was placed in a moisture-permeable cup to which about 15 g of calcium chloride had been added. The cup was placed and stored in a thermostatic chamber at a temperature of 40° C. and a humidity of 90% R.H. The weight of the calcium chloride was measured before and after the storage for 24 hours, and the increase in the weight of the calcium chloride was determined and used to calculate the water-vapor permeability ($g/m^2/24$ h).
<Transparent Protective Films>
A 55-μm-thick, biaxially-stretched, norbornene resin film (ZEONOR (trade name) manufactured by ZEON CORPORATION) was used as an ultraviolet transmitting transparent protective film with a 365 nm wavelength light transmittance of 80% or more. This norbornene resin film has a 365 nm wavelength light transmittance of 91.1%, a water-vapor permeability of 11 ($g/m^2/24$ hours), an in-plane retardation of 55 nm, and a retardation of 135 nm in its thickness direction.

A 60-μm-thick triacetylcellulose film (TAC film) (23.3 in SP value) was used as an ultraviolet non-transmitting transparent protective film with a 365 nm wavelength light transmittance of less than 5%, without being subjected to any treatment such as saponification or a corona treatment (hereinafter, TAC not having undergone any treatment such as saponification or a corona treatment is also referred to as "untreated TAC"). The untreated TAC film has a 365 nm wavelength light transmittance of 0.1% and a water-vapor permeability of 507 ($g/m^2/24$ hours).
<Active Energy Rays>
The source of active energy rays used was a visible light irradiator (gallium-containing metal halide lamp) Light Hammer 10 manufactured by Fusion UV Systems Inc. (valve: V valve; peak illuminance: 1,600 $mW/cm^2$; total irradiance: 1,000 $mJ/cm^2$; wavelength: 380-440 nm). The illuminance of the visible light was measured with Sola-Check System manufactured by Solatell Ltd.
(Preparation of Active Energy Ray-Curable Adhesive Compositions)
The following components were used.
(1) Radically Polymerizable Compound (A)
Hydroxyethylacrylamide (HEAA), 29.6 in SP value, capable of forming a homopolymer with a Tg of 123° C., manufactured by KOHJIN Film & Chemicals Co., Ltd.
(2) Radically Polymerizable Compound (B)
Aronix M-220 (M-220) (tripropylene glycol diacrylate), 19.0 in SP value, capable of forming a homopolymer with a Tg of 69° C., manufactured by Toagosei Co., Ltd.
(3) Radically Polymerizable Compound (C)
Acryloylmorpholine (ACMO), 22.9 in SP value, capable of forming a homopolymer with a Tg of 150° C., manufactured by KOHJIN Film & Chemicals Co., Ltd.
(4) Acrylic Oligomer (D) Formed by Polymerization of (Meth)Acrylic Monomer
ARUFON UP-1190 (UP-1190) manufactured by Toagosei Co., Ltd.
(5) 2-acetoacetoxyethyl methacrylate (AAEM), 20.23 $(MJ/m^3)^{1/2}$ in SP value, capable of forming a homopolymer with a Tg of 9° C., manufactured by The Nippon Synthetic Chemical Industry Co., Ltd.
(6) Compound of Formula (1)
KAYACURE DETX-S(DETX-S) (diethyl thioxanthone) manufactured by Nippon Kayaku Co., Ltd.
(7) Photopolymerization Initiator (Compound of Formula (2))
IRGACURE 907 (IRG907) (2-methyl-1-(4-methylthiophenyl)-2-morpholinopropan-1-one), manufactured by BASF

Example 1

An active energy ray-curable adhesive composition was prepared by mixing HEAA, M-220, ACMO, UP-1190, AAEM, IRGACURE 907, and KAYACURE DETX-S in a ratio HEAA/M-220/ACMO/UP-1190/AAEM/IRGACURE 907/KAYACURE DETX-S of 16.4/32.8/32.8/8.2/5.7/2.5/1.6 (the values are % by weight when the total amount of the composition is normalized as 100% by weight) and stirring the mixture at 50° C. for 1 hour.
(Preparation of Thin Polarizing Film X and Preparation of Polarizing Film Therewith)
A thin polarizing film X was prepared as follows. First, a laminate including an amorphous PET substrate and a 24-μm-thick PVA layer formed thereon was subjected to auxiliary in-air stretching at a stretching temperature of 130° C. to form a stretched laminate. Subsequently, the stretched laminate was subjected to dyeing to form a dyed laminate, and the dyed laminate was subjected to stretching in an aqueous boric acid solution at a stretching temperature of 65° C. to a total stretch ratio of 5.94 times, so that an optical film laminate was obtained which had a 10-μm-thick PVA layer stretched with the amorphous PET substrate. Such two-stage stretching successfully formed an optical film laminate having a 10-μm-thick PVA layer formed on the amorphous PET substrate, in which the PVA layer contained highly oriented PVA molecules and formed a highly-functional polarizing film X in which iodine adsorbed by the dyeing formed a polyiodide ion complex oriented highly in a single direction. The active energy ray-curable adhesive composition was applied with a thickness of 0.5 μm to the norbornene resin film (first transparent protective film (ultraviolet transmitting transparent protective film)) using an MCD coater (manufactured by FUJI KIKAI KOGYO Co., Ltd; cell shape: honeycomb; the number of gravure roll lines: 1000/inch; rotational speed: 140% relative to line speed) (first applying step). The adhesive-coated surface was laminated to the surface of the thin polarizing film X (5.0% in moisture content) of the optical film laminate (first laminating step). Subsequently, irradiation of active energy rays was carried out by way of the norbornene film (first transparent protective film) so that the active energy ray-curable adhesive composition was cured (first bonding step). The amorphous PET substrate was then peeled off from the thin polarizing film X (peeling step). The active energy ray-curable adhesive composition was then applied to the surface of the thin polarizing film X on the side where the amorphous PET substrate had been peeled off (second applying step). The adhesive-coated surface was laminated to the untreated TAC film (second transparent protective film (ultraviolet non-transmitting transparent protective film)) (second laminating step). Subsequently, irradiation of active energy rays was carried out by way of the untreated TAC film (second transparent protective film) so that the active energy ray-curable adhesive composition was cured (second bonding step). The product was then dried with hot air at 70° C. for 3 minutes to give a polarizing film. The lamination was performed at a line speed of 25 m/minute. The resulting polarizing film was evaluated for adhering strength and curling degree under the conditions described below.

Example 2

A polarizing film was produced using the same process as in Example 1, except that the untreated TAC film was used as the first transparent protective film and that the norbornene resin film was used as the second transparent protective film.

Example 3

A polarizing film was produced using the same process as in Example 1, except that the untreated TAC films were used as both the first and second transparent protective films.

Example 4

A polarizing film was produced using the same process as in Example 1, except that the first bonding step was performed after the second laminating step.

Comparative Example 1

A polarizing film was produced using the same process as in Example 1, except that only irradiation of active energy rays was carried out by way of the norbornene resin film (first transparent protective film) without irradiation of active energy rays by way of the untreated TAC film (second transparent protective film), which means single-stage irradiation as in conventional techniques.

<Adhering Strength>

The polarizing film was cut into a piece with a length of 200 mm parallel to the stretched direction of the polarizer and with a width of 20 mm perpendicular thereto. The cut piece of the polarizing film was bonded to a glass plate. An incision was made between the transparent protective film and the polarizer (32.8 in SP value) with a cutter knife. The transparent protective film was peeled off from the polarizer at an angle of 90° and a peeling rate of 500 mm/minute using a Tensilon tester when the peel strength was measured. The surface exposed by the peeling-off was also measured for infrared absorption spectrum by ATR method, and the interface exposed by the peeling-off was evaluated based on the criteria below.

A: Cohesive failure of the protective film
B: Interfacial peeling between the protective film and the adhesive layer
C: Interfacial peeling between the adhesive layer and the polarizer
D: Cohesive failure of the polarizer As for the criteria, A and D mean that the adhering strength is excellent because it is higher than the cohesive strength of the film. On the other hand, B and C mean that the adhering strength at the interface between the protective film and the adhesive layer (or between the adhesive layer and the polarizer) is insufficient (or the adhering strength is poor). Taking these into account, the adhering strength evaluated as A or D is rated as O (good), the adhering strength evaluated as A/B ("cohesive failure of the protective film" and "interfacial peeling between the protective film and the adhesive layer" occur simultaneously) or the adhering strength evaluated as A/C ("cohesive failure of the protective film" and "interfacial peeling between the adhesive layer and the polarizer" occur simultaneously) is rated as Δ (fair), and the adhering strength evaluated as B or C is rated as X (poor).

<Evaluation of the Degree of Curling of Polarizing Film>

The polarizing film was cut into a 100 mm×150 mm sample with its long side in the stretched direction. The sample was placed on a horizontal surface in such a manner that its convex surface faced downward, and the distance between the horizontal surface and each of the four edges of the sample was measured. When the average of the four distances was less than 30 mm, the polarizing film was evaluated as being less curled and as being acceptable for use (O). On the other hand, when the average was more than 30 mm, the polarizing film was evaluated as being significantly curled and as being unacceptable for use (x).

TABLE 2

| | Structure | | Adhering strength | | |
| --- | --- | --- | --- | --- | --- |
| | First transparent protective film | Second transparent protective film | First transparent protective film | Second transparent protective film | Degree of curling |
| Example 1 | ZEONOR | Untreated TAC | ○ | ○ | ○ |
| Example 2 | Untreated TAC | ZEONOR | ○ | ○ | ○ |
| Example 3 | Untreated TAC | Untreated TAC | ○ | ○ | ○ |
| Example 4 | ZEONOR | Untreated TAC | ○ | ○ | ○ |

TABLE 2-continued

| | Structure | | Adhering strength | | |
|---|---|---|---|---|---|
| | First transparent protective film | Second transparent protective film | First transparent protective film | Second transparent protective film | Degree of curling |
| Comparative Example 1 | ZEONOR | Untreated TAC | ○ | x | x |

What is claimed is:

1. A method for manufacturing a polarizing film comprising a polarizer, a first transparent protective film provided on one surface of the polarizer with an adhesive layer interposed therebetween, and a second transparent protective film provided on another surface of the polarizer with an adhesive layer interposed therebetween, the method comprising:
an applying step comprising applying an active energy ray-curable adhesive composition to (1) at least one of: the first transparent protective film and a surface of the polarizer facing the first transparent protective film, and (2) at least one of: the second transparent protective film and a surface of the polarizer facing the second transparent protective film;
laminating the polarizer and the first transparent protective film;
laminating the polarizer and the second transparent protective film;
bonding the polarizer and the first transparent protective film with the adhesive layer interposed therebetween;
bonding the polarizer and the second transparent protective film with the adhesive layer interposed therebetween; and
curing the active energy ray-curable adhesive composition by first using active energy rays to carry out irradiation by way of only the first transparent protective film and then using the active energy rays to carry out irradiation by way of only the second transparent protective film, thereby forming the adhesive layers.

2. The method according to according to claim 1, wherein the active energy ray-curable adhesive composition contains radically polymerizable compounds (A), (B), and (C) as curable components, and an acrylic oligomer (D) formed by polymerization of a (meth)acrylic monomer, wherein
the radically polymerizable compound (A) has an SP value of 29.0 $(MJ/m^3)^{1/2}$ to 32.0 $(MJ/m^3)^{1/2}$,
the radically polymerizable compound (B) has an SP value of 18.0 $(MJ/m^3)^{1/2}$ to less than 21.0 $(MJ/m^3)^{1/2}$,
the radically polymerizable compound (C) has an SP value of 21.0 $(MJ/m^3)^{1/2}$ to 23.0 $(MJ/m^3)^{1/2}$, and
the composition contains 25 to 80% by weight of the radically polymerizable compound (B) when the total amount of the composition is normalized as 100% by weight.

3. The method according to claim 2, wherein the composition contains 3 to 40% by weight of the radically polymerizable compound (A), 5 to 55% by weight of the radically polymerizable compound (C), and 3 to 20% by weight of the acrylic oligomer (D) when the total amount of the composition is normalized as 100% by weight.

4. The method according to claim 2, wherein the radically polymerizable compounds (A), (B), and (C) are each capable of forming a homopolymer with a glass transition temperature (Tg) of 60° C. or higher.

5. The method according to claim 2, wherein the radically polymerizable compound (A) is hydroxyethylacrylamide and/or N-methylolacrylamide.

6. The method according to claim 2, wherein the radically polymerizable compound (B) is tripropylene glycol diacrylate.

7. The method according to claim 2, wherein the radically polymerizable compound (C) is acryloylmorpholine and/or N-methoxymethylacrylamide.

8. The method according to claim 2, wherein the composition contains a radically polymerizable compound having an active methylene group and a radical polymerization initiator (E) having a hydrogen-withdrawing function.

9. The method according to claim 8, wherein the active methylene group is an acetoacetyl group.

10. The method according to claim 8, wherein the radically polymerizable compound having an active methylene group is acetoacetoxyalkyl (meth)acrylate.

11. The method according to claim 8, wherein the radical polymerization initiator (E) is a thioxanthone radical polymerization initiator.

12. The method according to claim 8, wherein the composition contains 1 to 50% by weight of the radically polymerizable compound having an active methylene group and 0.1 to 10% by weight of the radical polymerization initiator (E) when the total amount of the composition is normalized as 100% by weight.

13. The method according to claim 1, wherein the active energy ray-curable adhesive composition contains, as a photopolymerization initiator, a compound represented by formula (1):

[Formula 1]

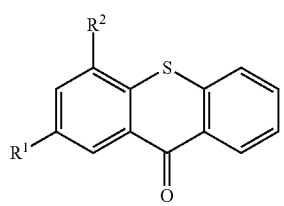

(1)

wherein $R^1$ and $R^2$ each represent —H, —$CH_2CH_3$, —IPr, or Cl, and $R^1$ and $R^2$ may be the same or different.

14. The method according to claim 13, wherein the composition further contains, as a photopolymerization initiator, a compound represented by formula (2):

[Formula 2]

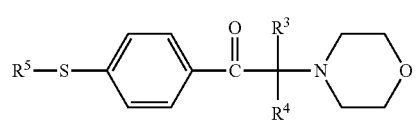

(2)

wherein $R^3$, $R^4$, and $R^5$ each represent —H, —$CH_3$, —$CH_2CH_3$, —IPr, or Cl, and $R^3$, $R^4$, and $R^5$ may be the same or different.

15. The method according to claim 1, wherein the first transparent protective film has a 365 nm wavelength light transmittance of 80% or more, and the second transparent protective film has a 365 nm wavelength light transmittance of less than 5%.

16. The method according to claim 1, wherein the first transparent protective film has a 365 nm wavelength light transmittance of less than 5%, and the second transparent protective film has a 365 nm wavelength light transmittance of 80% or more.

17. The method according to claim 1, wherein the first and second transparent protective films have a 365 nm wavelength light transmittance of less than 5%.

18. The method according to claim 1, wherein the first and second transparent protective films have a 365 nm wavelength light transmittance of 80% or more.

19. The method according to claim 1, wherein the active energy rays include visible rays with a wavelength ranging from 380 nm to 450 nm.

20. The method according to claim 1, wherein the active energy rays are such that the ratio of the total illuminance in the wavelength range of 380 nm to 440 nm to the total illuminance in the wavelength range of 250 nm to 370 nm is from 100:0 to 100:50.

21. The method according to claim 1, wherein the active energy rays are produced using a gallium lamp as a light source and using a band pass filter to block ultraviolet rays with wavelengths of 380 nm or less.

22. The method according to claim 1, wherein the polarizer has a thickness of 10 μm or less.

23. The method according to claim 1, wherein the polarizing film has a total thickness of 150 μm or less.

24. The method according to claim 1, wherein the first and second transparent protective films each have a thickness of 1 to 500 μm.

* * * * *